United States Patent [19]

Forsen et al.

[11] 4,097,847
[45] Jun. 27, 1978

[54] MULTI-FONT OPTICAL CHARACTER RECOGNITION APPARATUS

[75] Inventors: George E. Forsen, Glastonbury; Stephen F. Jackson, East Hartford, both of Conn.

[73] Assignee: Scan-Optics, Inc., East Hartford, Conn.

[21] Appl. No.: 577,151

[22] Filed: May 14, 1975

Related U.S. Application Data

[63] Continuation of Ser. No. 270,192, Jul. 10, 1972, abandoned.

[51] Int. Cl.² .............................................. G06K 9/16
[52] U.S. Cl. .................. 340/146.3 AE; 340/146.3 AG
[58] Field of Search ............. 340/146.3 AE, 146.3 H, 340/146.3 AC, 146.3 R, 146.3 AG

[56] References Cited

U.S. PATENT DOCUMENTS

| 3,159,815 | 12/1964 | Groce | 340/146.3 AG |
| 3,196,398 | 7/1965 | Baskin | 340/146.3 H |
| 3,303,465 | 2/1967 | Essinger et al. | 340/146.3 AE |
| 3,417,372 | 12/1968 | Bieser | 340/146.3 MA |
| 3,502,993 | 3/1970 | Schurzinger | 340/146.3 AG |
| 3,541,511 | 11/1970 | Genchi et al. | 340/146.3 AC |
| 3,609,685 | 9/1971 | Deutsch | 340/146.3 AE |
| 3,629,828 | 12/1971 | Demer | 340/146.3 AG |
| 3,737,855 | 6/1973 | Cutaia | 340/146.3 AG |
| 3,766,520 | 10/1973 | Patterson | 340/146.3 AE |

Primary Examiner—Leo H. Boudreau

Attorney, Agent, or Firm—Brumbaugh, Graves, Donohue & Raymond

[57] ABSTRACT

As described herein, a program controlled image dissector tube scans the printed information recorded on a storage medium in a first raster to provide analog information signals representative of segments of the recorded information and in a second raster to provide analog information signals representative of all the recorded information. If, as determined by the analog information signals representative of segments of the recorded information, the printed information is legible, the analog information signals representative of all the printed information are converted into digital form and scaled, if necessary, to reduce the digital character data to a predetermined scan length. Selected arrays of the digital character data are then scanned to develop black or white signals about a center bit within such arrays. The black or white signals are, in turn, accumulated to provide an array of black and white signals representative of an entire character. The contour of the array of black and white signals is then traced to develop contour digital data representative of incremental moves about the perimeter of the character. The extent and direction of such incremental moves are then accumulated to develop parameters. The parameters are then selectively combined and the areas bounded by such parameters calculated to develop feature indication signals. The feature indication signals are then accumulated, compared against preselected recognition thresholds and classified as a particular character.

8 Claims, 25 Drawing Figures

INTERFACE & SCAN CONTROL

INTERFACE & SCAN CONTROL

| MOVE | ΔX | ΔY |
|------|----|----|
| 1 | +1 | -1 |
| 2 | +1 | 0 |
| 3 | +1 | -1 |

** FIRST & LAST POINT OF TRACE

CONVEX FEATURES

SPUR

WEDGE

SHORT SPUR (STUB)

SHORT ARC (CURL)

ARC

CONCAVE FEATURES

BAY

CUSP

NEITHER CONVEX NOR CONCAVE

LINE

Standard Prototypes (Character Styles)

Standard Numeric Set:

1 2 3 4 5 6 7 8 9 0

Non-Standard Numeric Prototypes: *

2 4 5 6 8 9 0

Standard Alphabetic Set:

C S T X Z

Non-Standard Alphabetic Prototype: **

T

Standard Special Symbol Set:

+ —

Optional 3/16" Gothic Set: ***

1 2 9

\* Should be considered as part of the Standard Numeric Set

\*\* Should be considered as part of the Standard Alphabetic Set

\*\*\* When the 3/16" Gothic Font is selected, it automatically calls the 0, 3, 4, 5, 6, 7 and 8 of the Standard Numeric Set

FIG. 20

MULTI-FONT OPTICAL CHARACTER RECOGNITION APPARATUS

This is a continuation of application Ser. No. 270,192 filed July 10, 1972 now abandoned.

This invention relates to character recognition apparatus for converting recorded character information into a form directly suitable for electronic data processing and, more particularly, to an optical character recognition apparatus wherein multi-font, including hand printed characters are sensed optically and thereafter converted to a form directly suitable for electronic data processing.

An optical character recognition system for converting alphanumeric character information recorded on either a page or a document into a form directly suitable for electronic data processing with a minimum of both substitutional and reject errors is disclosed in U.S. Pat. No. 3,723,970, issued Mar. 27, 1973, entitled "Optical Character Recognition System" and assigned to the assignee of the present invention. As disclosed in U.S. Pat. No. 3,723,970, a program controlled image dissector tube scans the printed information recorded on a storage medium to provide analog information signals. The analog signals are converted into digital data signals, representative of the segmental brightness of the scanned storage medium, and thereafter accumulated in an image enhancement network. In the image enhancement network, selected arrays of the signals are scanned to develop directional and threshold digital data bits representative of the character information obtained in each of the arrays. These digital data bits are, in turn, accumulated to provide arrays of the digital data bits representative of entire characters. The presence or absence of selected digital data bits in each of the arrays is then detected and the detected digital data bits combined to provide a character representative signal.

As more particularly described in said U.S. Pat. No. 3,723,970, the system incorporates microfeatures which represent the accumulations of certain directional and threshold bits in a predetermined matrix. Specific combinations of selected microfeatures, together with an absence of other selected microfeatures, permit the system to identify with extreme accuracy the presence and identity of a particular character. In each instance, the detection of a so-called threshold signal in the logic is a prerequisite to the detection of any particular microfeature.

As and for a next generation of optical character recognition systems, constraints such as the type font for the characters recorded on the documents should not be a prerequisite to the accurate detection of the recorded information. Specifically, optical character recognition systems should be capable of converting hand printed character information, either upright or skewed, into a form directly suitable for electronic data processing with a minimum of both substitutional and reject errors. It is to this latter generation of optical character recognition systems which the present invention appertains.

SUMMARY OF THE INVENTION

In accordance with the present invention, a program controlled image dissector tube scans the printed information recorded on a storage medium in a first raster to provide analog information signals representative of segments of the recorded information and in a second raster to provide analog information signals representative of all the recorded information. If, as determined by the analog information signals representative of segments of the recorded information, the printed information is legible, the analog information signals representative of all the printed information are converted into digital form and scaled, if necessary, to reduce the digital character data to a predetermined scan length. Selected arrays of the digital character data are then scanned to develop black or white signals about a center bit within such arrays. The black or white signals are, in turn, accumulated to provide an array of black and white signals representative of an entire character. The contour of the array of black and white signals is then traced to develop contour digital data representative of incremental moves about the perimeter of the character. The extent and direction of such incremental moves are then accumulated to develop parameters. The parameters are then selectively combined and the areas bounded by such parameters calculated to develop feature indication signals. The feature indication signals are then accumulated, compared against preselected recognition thresholds and classified as a particular character.

BRIEF DESCRIPTION OF THE DRAWINGS

In the Drawings:

FIG. 20 illustrates typical character styles which may be detected by the system of FIG. 1.

DESCRIPTION OF THE PREFERRED EMBODIMENT

Figure 1A:
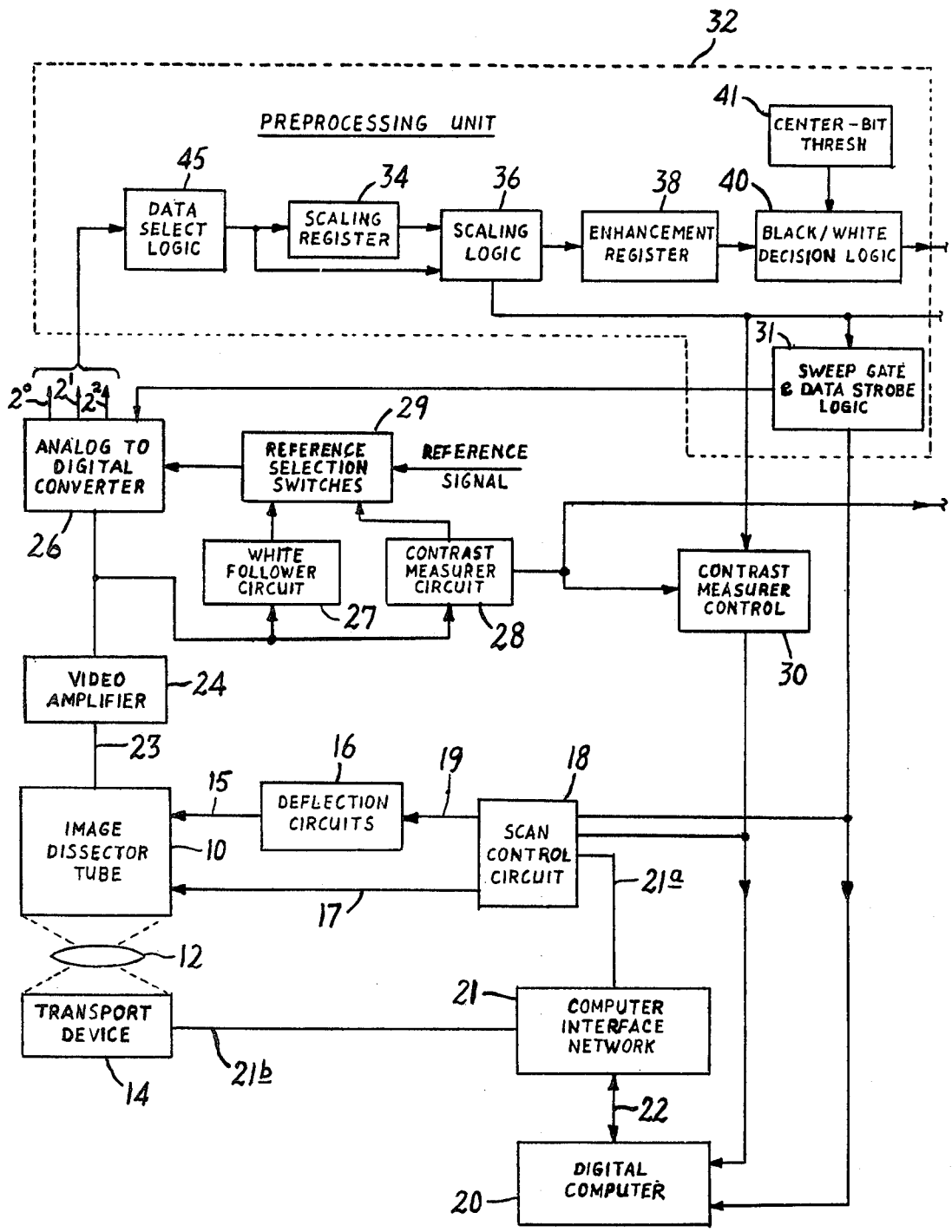
FIG. 1 is a schematic block diagram of a typical multi-font optical character recognition system arranged according to the present invention.

In the schematic block diagram of an optical character recognition system arranged according to the present invention, as shown in FIG. 1, an image dissector tube 10 scans through a projection lens 12 the printed information (characters) recorded on a page which is carried into alignment with the scanning area of the image dissector 10 by a transport device 14. Under the control of sweep deflection voltage signals supplied to the image dissector 10 over a cable 15 by deflection circuit 16, which may be of conventional construction and under the control of the appropriate blanking signals supplied to the image dissector 10 over a cable 17 by a scan control circuit 18, which also may be of conventional construction, the image dissector 10 scans a predetermined area on the transport device 14 in a line-by-line pattern.

In a system that has been operated successfully, the entire photoelectric image of a nine inch-by-nine-inch area in the transport device is periodically dissected by the aperture of the image dissector 10. As will be understood, in addition to supplying the blanking signals to the image dissector 10, the scan control circuit 18 supplies the appropriate V-drive and H-drive signals to the deflection circuits 16 over the cable 19 to enable the circuits included therein to produce the appropriate horizontal and vertical deflection voltage signals. The frequency and area of the photoelectric image dissected by the aperture of the dissector 10 are controlled in accordance with a predetermined program incorporated into a digital computer 20. The computer 20, which may be programmed, generates the appropriate drive and blanking signals and supplies such signals to a computer interface network 21 with which it is in two-way communication through a cable 22.

The interface network 21, which includes analog-to-digital and digital-to-analog converters, couples the appropriate drive and blanking signals to the scan control circuit 18 by way of a cable 21a. In addition, the network 21 is in two-way communication with the transport device 14 by means of a cable 21b. This interconnection between the network 21 and the transport device 14 enables the computer 20 to control the operation of the transport device and maintain synchronism between the operation of the device 14 and the periodic sampling of the photoelectric image of the character storage medium by the image dissector tube 10. For example, a line on the page being sampled by the image dissector tube 10 may be sampled two or more times under program control to assure the accurate recognition of the characters recorded on the scanned page, while at the same time the device 14 is precluded from advancing such page outside the scanning area of the image dissector 10.

To compensate for skewed multi-font characters, such as skewed hand printed characters, the raster sweep may be dynamically rotated in predetermined increments, such as 0.5° increments, over a predetermined range, such as, for example, from −8° to +7.5°.

Negative rotation values result in counterclockwise rotation of the raster, while positive values result in clockwise rotation. If a character is skewed counterclockwise in the read area, the raster must be rotated counterclockwise in order to have beam travel parallel to the vertical strokes of the character. Also, in order to maintain the vertical starting point of the beam with respect to the center of the data line, the Y address must be effectively decreased as the scan moves from left to right across the scanning area.

The desired raster rotation may be simply accomplished by coupling selected amounts of the X deflection signal to the Y deflection amplifier within the circuit 16 and coupling selected amounts of the Y deflection signal to the X deflection amplifier. The portions of X and Y deflection signals coupled to the Y and X deflection amplifiers will control the amount of rotation to be achieved. In particular, due to the increasing X address, as the raster moves from right to left, the portion of the X deflection coupled to the Y amplifier subtracts from the Y position value. Thus, the starting point of Y will move upwardly with each selected scan. Also, as each raster sweep is generated, the portion of the sweep ramp coupled to the X amplifier adds to the X position signal, causing the horizontal position of the image dissector tube beam to move a predetermined distance at the ramp rate. The effect of this action on the raster sweep is to skew the raster sweep in the direction of the skewed recorder character. For positive rotation, the polarity of the cross-coupled signals are reversed, causing the starting point of Y to move downwardly and the beam to move leftwardly during the ramp.

As understood in the art, the analog information signals derived by the image dissector 10 have maximum amplitude where the scanned area is white and the minimum amplitude for the scanned area that is black. The analog signals, representative of the brightness in the sampled page are supplied by way of a cable 23 and a conventional video amplifier 24 to the input terminals of an analog-to-digital converter 26 and to the input terminals of a white follower circuit 27 and a contrast measurer circuit 28, which is an analog sample and hold circuit that stores the video value of the blackest portions of the character that is to be read.

In the analog-to-digital converter 26, the information signals are converted into three bits of digital information identified at the output terminals of the converter as $2^0$, $2^1$ and $2^2$. As will be understood in the art, the converter 26 produces a binary sum signal of 7, viz., 111, in response to a maximum brightness signal supplied thereto, produces a binary signal of 0, viz., 000, in response to a completely black signal supplied thereto and produces a binary sum signal of 3, viz., 011, for example, when a gray signal is developed by the dissector 10.

The white follower circuit 27 responds to the analog information signals to supply a control signal by way of a reference selection switch 29 to the converter 26 which enables the converter to produce a uniform digital signal (0–7) despite changes in the reflective nature of the paper, the non-uniform illumination of the paper and the light. In this way, shades of gray in the input analog signal are normalized whereby the digital output signal from the converter 26 will accurately represent the segmental brightness of the scanned paper. The switches 29 are provided for diagnostic testing purposes. To test the performance of the converter 26, the switches 29 are actuated to transmit to the converter 26 a reference signal of known amplitude and duration instead of the signals developed either by the circuit 27 or the circuit 28.

The contrast measurer circuit 28, controlled by a contrast measurer control circuit 30, is provided to make certain that the recorded characters are sufficiently legible to be read. The contrast measurer control 30 is a read only memory (ROM) whose program generates the contrast measurer grid. Specifically, the function of the contrast measurer circuit 28 is to determine the legibility of each character prior to a reading operation. Initiation of a contrast measurement operation causes the image dissector beam to be moved through a predetermined pattern covering a character box. As the beam is moved, data samples of the character and its background are taken and the legibility decisions are made to determine whether or not the character can be read and to determine the best scan speed for reading.

Outputs of the contrast measurer are received by the analog-to-digital converter 26 by way of the switches 29 and by a so-called perimeter trace processor subsystem of the present invention (described hereinafter). A contrast measurement is initiated by the perimeter trace processor before attempting to read each character. The result of the contrast measurement provides white and black reference levels for the analog-to-digital converter 26 and provides a recommended reading speed (high, medium or low) to the perimeter trace processor. Also, the perimeter trace processor receives the signals indicating whether the character data is too light or the background too dark to permit accurate reading.

In particular, at the start of each read operation, a contrast measurement operation is initiated by supplying control signals from the contrast measurer control circuit 30 and a sweep gate and date strobe logic circuit 31 forming part of a preprocessor unit 32 (described hereinbelow) to the scan control circuit 18. The computer 20 then generates control signals for the scan control circuit 18 which cause the beam of the image dissector tube to move in a preprogrammed pattern over the area defined by so-called box height and box spacing parameters, beginning at predetermined points in the scan. As the beam is deflected over the set pattern, control signals are sent by way of the contrast measurer circuit 28 to the perimeter trace processor causing data samples to be taken and stored.

Figure 2:
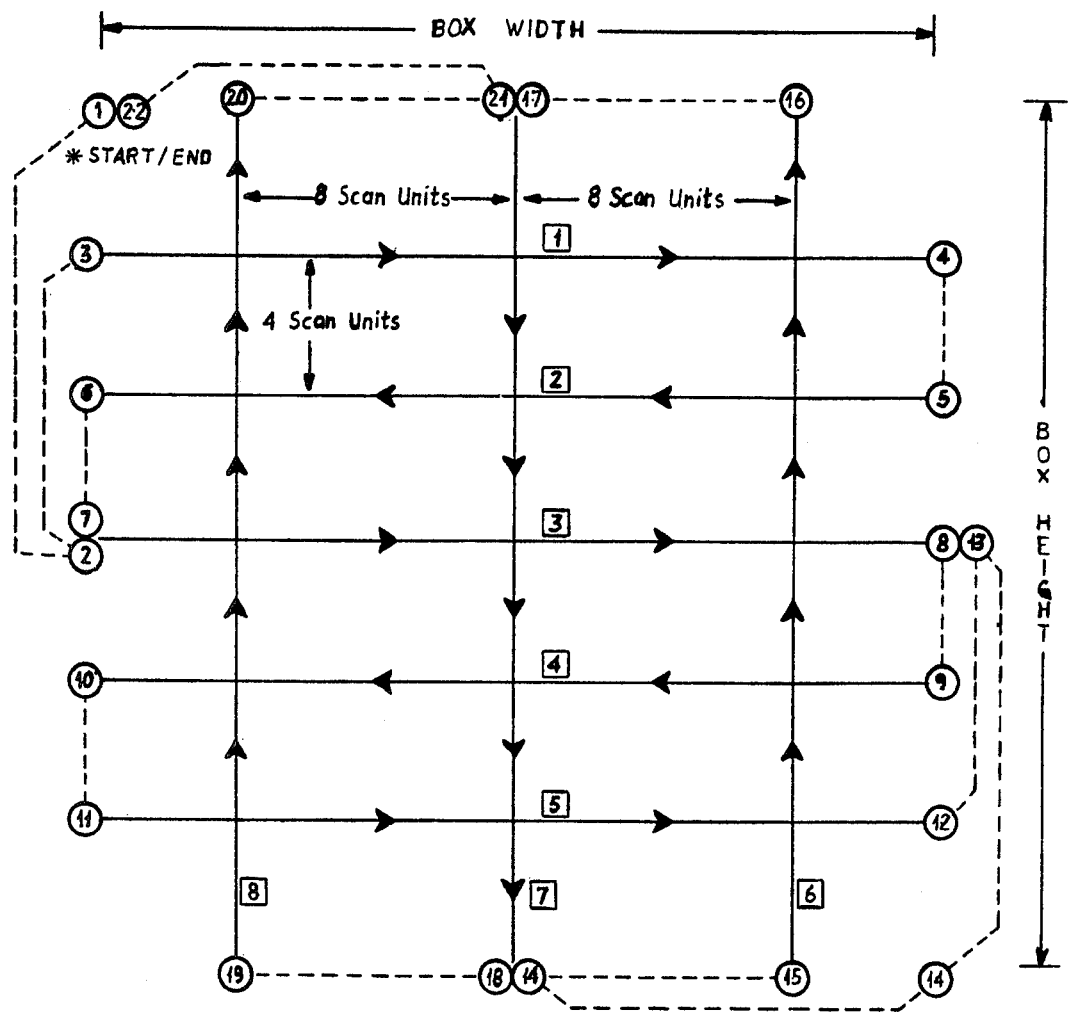
FIG. 2 illustrates graphically the first raster pattern carried out by the image dissector tube included within the system of FIG. 1.

The pattern and sequence of beam movements are shown in FIG. 2 by the numbers enclosed in circles. The length of the vertical and horizontal scans is sufficient to traverse a character of any size. All scans occur at medium speed, for example, 4 microseconds per scan unit. A black level is generated by sampling and averaging signal voltages. During each of the first four data scans, the peak black level is taken by a peak hold circuit and, at the end of each scan, the value is transferred to a holding circuit (not shown). At the end of the first four scans, each of the four sample and hold circuits is storing the peak black level seen during its scan. The peak black values obtained during each of the last four scans are compared with these stored values. Higher black values from the last four scans replace lower values from the first four scans. The end result is that the highest four black values from the eight scans are saved. These four peak values are averaged within the perimeter trace processor and compared with predetermined boundaries to select a reading speed of high, medium or low. If none of the speed boundary conditions is met, a space or data-too-light condition is indicated.

The summed value of the four peaks is stored at the end of the operation within the contrast measurer circuit 28 to provide the black reference level for the analog-to-digital converter 26 when the character is read. In addition, during each of the five horizontal scans, the white level is averaged by an integrator circuit and used to charge a peak hold circuit. Thus the highest average white level seen during the five scans is available at the end of the operation. This average white level is compared with a fixed level such as, for example, $-2$ volts, to determine if the background level is too dark to attempt reading. If the average white level is more positive then $-2$ volts, a "too black" signal is generated. The stored white level is also provided within the circuit 28 as the white reference for the video analog-to-digital converter 26 when reading the character.

From the analog-to-digital converter 26, the digital data signals $2^0$, $2^1$ and $2^2$ representative of the segmental brightness of the scanned paper are supplied to the preprocessor 32. The primary functions of the preprocessor 32 are to (1) generate a sweep gate to the scan control circuit 18, (2) classify each scan unit of digitized video information as black or white, (3) scale character data when necessary, and (4) send the black/white data to the character memory in the perimeter trace processor. In order to reduce character data to more convenient dimensions for tracing, the preprocessing unit 32 contains logic for reducing or scaling input character data by factors of 1, ⅔ and ½. Scaling is selected by the perimeter trace processor as a function of scan length, that is, box height. Scaling of 1:1 is selected for sweep lengths of 52 scan units or less; scaling of 3:2 is selected for sweep lengths of 53 through 60 scan units and 2:1 scaling is selected for sweep lengths of 61 through 64 scan units.

The preprocessing unit receives parameters from the perimeter trace processor which determine the time duration of the sweep gate and the scaling factor. The duration of the sweep gate is a function of scan speed and scan length (box height). Sweep gates must be generated for scan lengths up to 64 scan units at speeds of 1 microsecond, 4 microseconds and 16 microseconds per scan unit.

The first major component of the preprocessor 32 is a scaling register 34 which is a three plane 64 stage serial shift register capable of storing a full sweep of data at the maximum sweep length. For 2:1 or 3:2 scaling, the incoming data is compared with data of the previous sweep in the second major component of the preprocessor, a scaling logic network 36 which determines the data to be loaded into an enhancement register 38. When 1:1 scaling is in effect, the scaling register 34 is not used and the incoming data loads directly into the enhancement register 38.

As explained in detail hereinbelow, the enhancement register 38 is a three-plane, 107 stage serial shift register. This register is logically arranged in three columns (two 52 stage columns each and one three stage column) to form a 3 by 3 matrix. Each scan unit of data is examined as it passes through the center stage of the matrix. The contents of the matrix are analyzed in a black/white decision network 40 which also receives a selected center bit threshold signal from a network 41. The network 40 then makes a black/white decision on the center bit within the matrix. The black/white value produced by the logic 40 is then sent to the perimeter trace processor 42 for storage in a character memory 44. The first three scan bits of each data sweep sent to the character memory 44 are generated as white (zero) bits to provide a white border above the character data. Also, after sending the last data scan unit to the character memory, two additional white scan units are sent to provide a white border below the character data.

There is further provided within the preprocessing unit 32 a data select logic circuit or gate 45 to which the digital data signals derived by the analog-to-digital converter 26 and prescribed digital data signals developed by the computer 20 are supplied. As is conventionally practiced the computer derived signals are supplied to the gate 45 when the system is tested.

The perimeter trace processor 42 (shown in FIG. 3) the the supplies as control signals to the preprocessing unit 32 (shown in FIG. 3) the scan length, scale factor, scan speed and sweep command signals as indicated by the labelled conductors. The preprocessing unit supplies black/white data and character memory load pulses to the perimeter trace processor 42 and supplies a sweep gate signal via the circuit 31 and scan control unit 18 to the image dissector tube 10 and supplies the sweep gate signal directly to the analog-to-digital converter 26 from circuit 31 (FIG. 1).

Figure 1B:
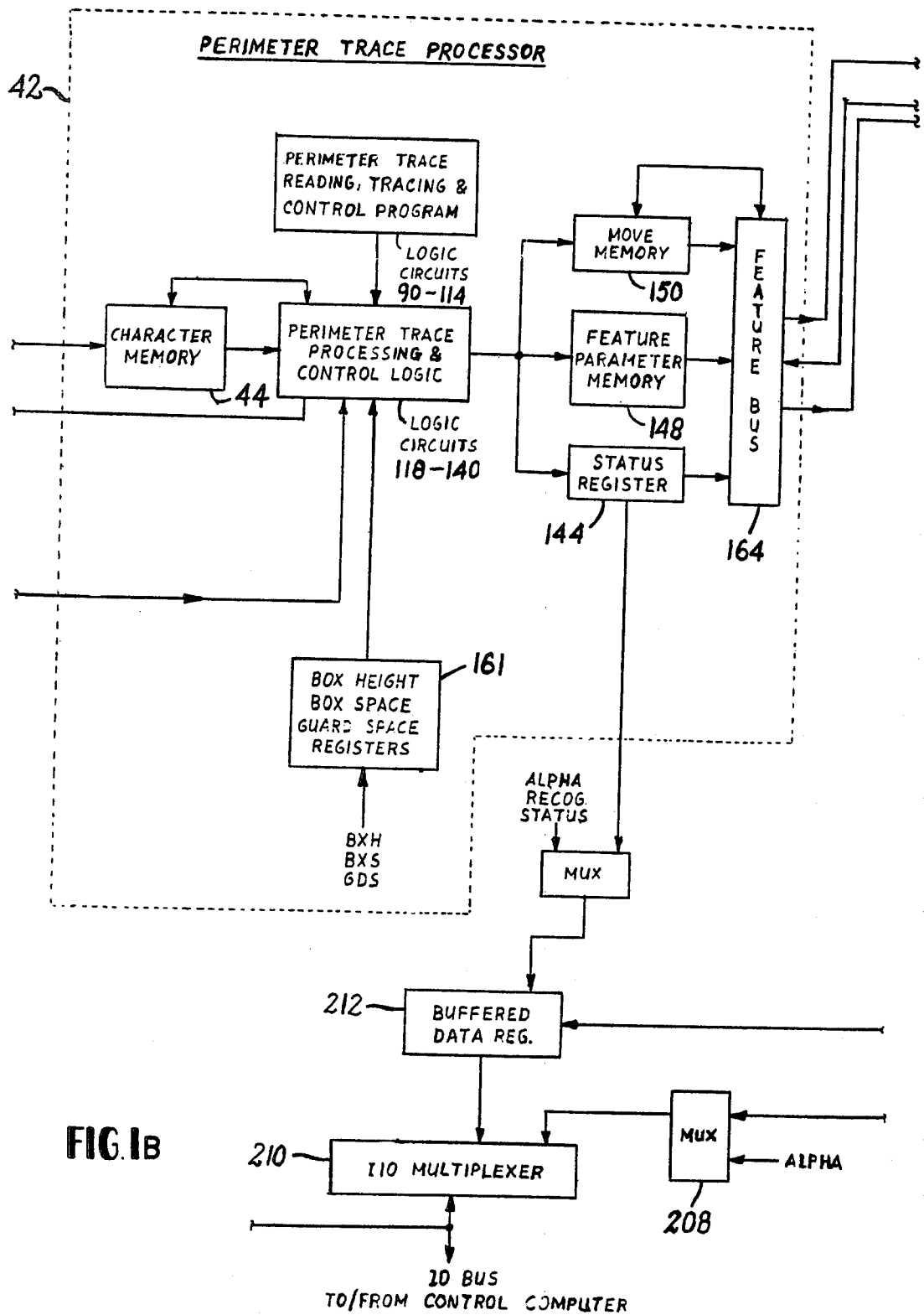

The preprocessing unit 32 executes two types of sweep commands; a data scan command and an insensitive scan command. The insensitive scan command initiates one raster sweep to load the scaling register 34 with scanned data and loads one sweep of pure white data into the enhancement register 38 (FIG. 1A) and the character memory 44 (FIG. 1B). This command is issued by the perimeter trace program to generate a vertical white border for the left side of the character data in character memory 44. The data scan command causes the scanned data to be scaled and shifted through the enhancement register 38 and the resultant black/white bits to be stored in the character memory 44.

As explained in greater detail hereinafter, for 1:1 scaling, the data scan command causes one raster sweep to be generated. As the data from this sweep is shifting into the enhancement register 38, decisions are made on the data from the previous sweep. The black/white bits resulting from these decisions are sent to the character memory 44. For 2:1 scaling, each data scan command causes two raster sweeps to be generated. During the first sweep, only the scaling register is loaded; no data is sent to the enhancement register 38 or to the character memory. During the second sweep, the incoming data and the scaling register contents are scaled into the enhancement register 38 and the black/white bits of a previous scan are sent to the character memory 44. For 3:2 scaling, the first data scan command generates two raster sweeps and the second command generates a single raster sweep. The first sweep loads only the scaling register and no data is sent to the enhancement register 38 or to the character memory 44. During the second sweep, the incoming data and the scaling register contents are scaled into the enhancement register and the black/white bits of the previous sweep are sent to the character memory 44. When the next data scan command is received a single sweep is generated and the incoming data is scaled directly into the enhancement register 38, while the black/white bits of a previous sweep are sent to the character memory 44.

Receipt of the data scan command turns on a sweep gate generator 46 and advances a mode control counter 47 from its wait condition (flag check) to an initialize mode for one microsecond. Initialize mode clears socalled scaling and enhancement shift pulse counters 48 and 49, loads the speed code into a speed control counter 50 and loads the shift pulse counter 48 with the negative of the scan length (complement of the scan length code).

The speed code or scan state allows the speed control counter 50 to generate data strobe signals which are then supplied to the scan control circuit 18 via the computer 20 and to drive a shift pulse generator 52 which, in turn, drives the counters 48 and 49 and an amplifier 53 which produces character memory load pulses. For all scale factors, the scaling register 34 loads serially at the scan rate until the scaling shift pulse counter 48 counts up to zero. When this occurs, the sweep gate 46 is turned off. If the scan length is less than 64, the remainder of the scaling register 34 is loaded with white scan units. This is accomplished by loading the true scan length code into the scaling shift pulse counter 48 and shifting white scan units into the register until the counter counts up to 63.

Generation of character memory load pulses by the amplifier 53 and enhancement register shift pulses by the counter 49 is controlled by the scale factor, via horizontal and vertical sequence counters 54 and 56. For 1:1 scaling, both pulses are generated at the scan rate and the enhancement register 38 is loaded directly with the incoming data. The first three enhancement shift pulses position new data in the 3 by 3 matrix of the enhancement register 38 and white data bits are sent to character memory with the corresponding three character memory load pulses. Following the first three shifts, the black/white decision bits representing the matrix center bit are sent to the character memory 44 at the scan rate. For 1:1 scaling, the scan length is 52 units or less and normal enhancement shift pulses and character memory load pulses terminate when the scaling shift pulse counter 48 counts up to zero. Any remaining unfilled stages of the enhancement register 38 are loaded with white data.

At the end of the sweep, another character memory load pulse is generated for loading the last black/white decision bit and two further character memory load pulses are generated for loading two white data bits into memory. This is to provide a white border below the character data in memory.

For 1:1 scaling, the data derived by the analog-to-digital converter 26 is transmitted through the gate 45, a comparator 58, a gate 59, a multiplexer 60 and a multiplexer 61 to the enhancement register 38; the scaling register 34 is not used. For 3:2 or 2:1 scaling, the data path to the enhancement register is through the scaling register 34, the comparator 58, the gate 59, the multiplexer 60, a gate 62, a BR register 63, a comparator 64, a gate 65 and the multiplexer 61 under control of the vertical and horizontal sequence counters 54 and 56.

Figure 4:
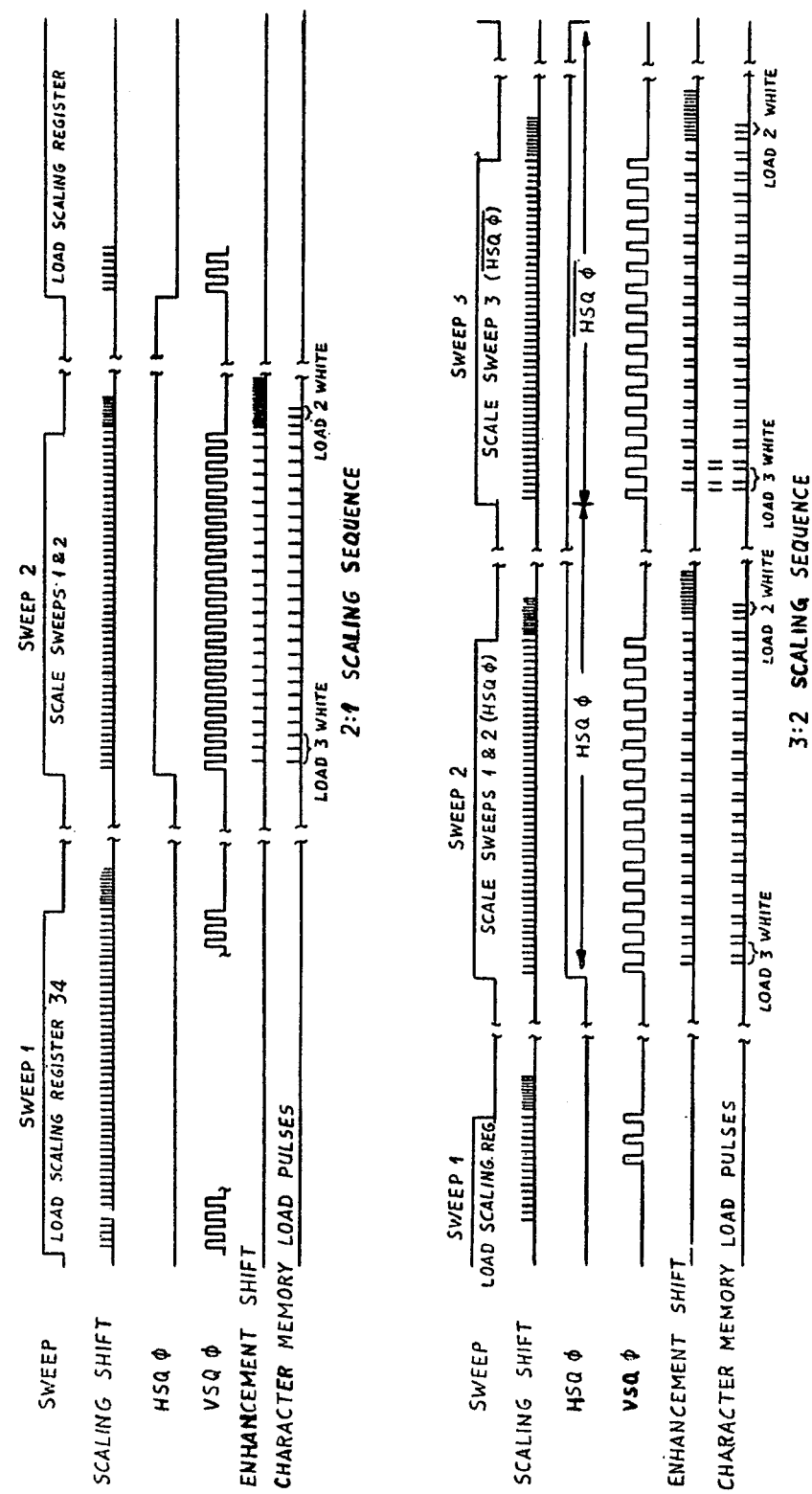
FIG. 4 is a graphic illustration of the sequence of timing pulses generated during 2:1 and 3:2 scaling by the preprocessing unit of FIG. 3.

FIG. 4 shows the timing sequence for 2:1 scaling. During the first sweep, the enhancement and character memory load pulses are inhibited by the horizontal sequence counter at gate 59. During the second sweep, the enhancement register and character memory pulses are generated at one-half the scan rate under control of the sequence counters 54 and 56. The horizontal sequence counter 56 causes each scan unit of the incoming data to be compared in the comparator 58 with the corresponding scan unit of data from the previous sweep which is stored in the scaling register 34. The blacker of the two scan units is stored in the BR register 63. On alternate scan units (alternate scaling register shift times) the vertical sequence counter 54 causes the inputs to the BR register 63 to be compared with its present contents and the blacker of the two values is steered through the enhancement register input multiplexer 61.

The timing sequence for 3:2 scaling is also shown in FIG. 4. On the second sweep of each group of three sweeps, the incoming data is scaled with the data of the previous sweep. On the first scaling shift pulse, the first scan unit of incoming data is compared in the comparator 58 with the corresponding scan unit from the scaling register 34 and the blacker of the two values is stored in the BR register 63. On the second shift pulse, the second scan unit of incoming data is compared with the corresponding scan unit in the scaling register 34. The blacker of these two scan units is then compared with the contents of the BR register 63 and the blackest of these values is stored in the enhancement register 38. Thus, four scan units from two sweeps have been reduced to one scan unit in the enhancement register 38. On the third scaling shift pulse, the incoming scan unit is compared with the corresponding scan unit from the scaling register 34 and the blacker of the two values is stored in the enhancement register 38. In this manner, each group of six scan units from the first and second sweeps are converted to two scan units for storage in the enhancement register 38.

On the third sweep, of each group of three sweeps, the contents of the scaling register are not used. Stage zero of the horizontal sequence counter 56 causes each scan unit of the incoming data to pass through the multiplexer 60 for storage in the BR register 63. The first scaling shift pulse loads the BR register 63 with the first scan unit of incoming data. On the second scaling shift pulse, the incoming scan unit of data is compared with the contents of the BR register 63 and the blacker of the two values is stored in the enhancement register 38. On the third scaling shift pulse, the incoming scan unit passes directly through the BR multiplexer 60 and enhancement multiplexer 61 and is stored in the enhancement register. This action continues for each group of three scan units in the sweep.

Scan is the major state of the mode counter 47. Scan causes the speed control counter 50 to increment with each repetition of a phase clock (not shown). Each time the speed control counter 50 counts up to all ones, a data strobe and scaling register shift pulse are generated and the speed control counter is reloaded with the speed code. It is during the scan state that the scaling shift pulses, load memory pulses and enhancement shift pulses are generated. When the scaling shift pulse counter 48 reaches an all ones configuration, the sweep gate 46 turns off. After the next shift pulse, normal generation of shift pulses and memory load pulses is discontinued. Also, the mode control counter 47 advances to the end of sweep state and remains in this state for one microsecond.

The end of sweep state causes the true scan length code to be loaded into the scaling shift pulse counter 48 and sets a high speed shift mode. If the scan length is 64, the high speed shift mode immediately resets and no fast shift pulses are generated. If the scan length is less than 64, the scaling register begins loading white data at a 5 Mhz rate. High speed shifting terminates when the scaling counter 48 reaches an all ones configuration. In this manner, unused stages of the scaling register 34 are filled with white data. The end of sweep state also generates one memory load pulse for loading the last black/white decision bit of a sweep into character memory 44.

Following the end of sweep state, the mode counter advances to the load white border state and remains in that state for two microseconds. This state and generates two load memory pulses, causing a white border of two scan units to be loaded below the character data in character memory 44. Load white border also sets the enhancement register high speed shift mode. If the enhancement shift pulse counter is at a count of 52 (enhancement register fully loaded), the high speed shift mode immediately resets and no high speed shifts are generated. If the count is less than 52, the enhancement register 38 begins loading white data at a 5 Mhz rate. High speed loading of white data terminates when the counter reaches a count of 52.

Following the load white border state, the mode counter advances to the flyback delay state for two microseconds. If the horizontal sequence counter state indicates that enhancement and character memory loading occurred on the current sweep, the busy signal to the perimeter trace processor is turned off. This will occur at the end of each sweep for 1:1 scaling; at the end of the second sweep for 2:1 scaling; and at the end of each second and third sweep for 3:2 scaling. Reset of the busy signal indicates, to the perimeter trace processor, that the preprocessor is ready to accept another scan command. The flyback delay state is two microseconds in duration to provide time for completion of high speed shifting before initiating another sweep.

Following the flyback delay the mode counter advances to the flag check state to initiate the next sweep or to wait for a scan command signal from the perimeter trace processor.

Figure 3:
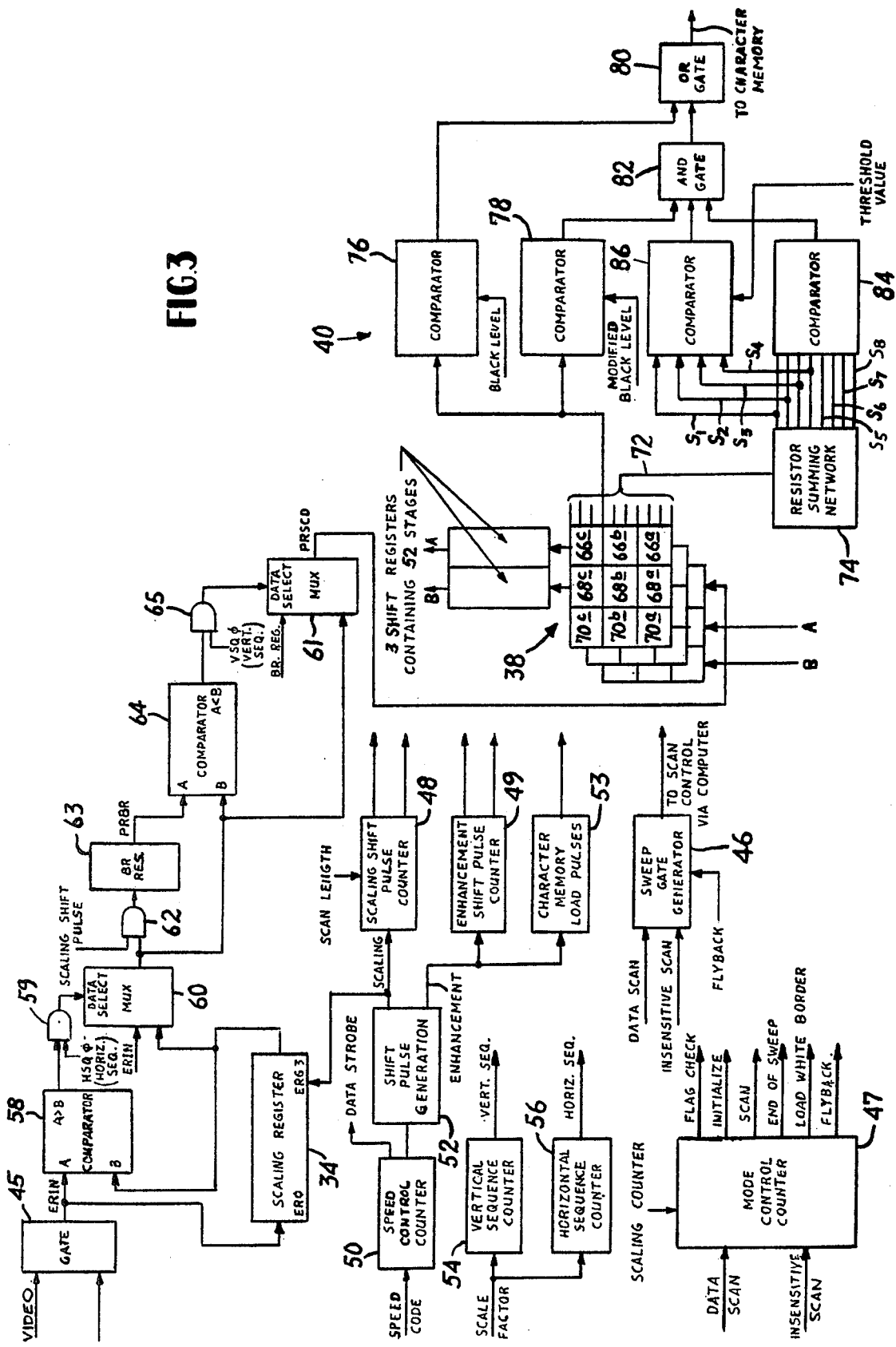
FIG. 3 is a schematic block diagram of a typical preprocessing logic network included within the system of FIG. 1.

From the multiplexer 61 the digital data signals $2^0$, $2^1$ and $2^2$ representative of the segmental brightness of the scanned paper are supplied to the image enhancement network 38. As shown in FIG. 3, the enhancement register comprises two shift register columns (in plan) 66 and 68, each of which includes three-52 bit shift registers arranged in superposed relation and a fifth shift register column 70 having three-3 bit shift registers arranged in superposed relationship. The digital brightness information bits $2^0$, $2^1$ and $2^2$ are supplied separately from the multiplexer 61 to the first flip-flop trio 66a in the shift register column 66. The data bits are shifted through the registers in the direction indicated by the arrows A and B. The data is shifted sequentially through the register columns 66, 68 and 70 in that order with the last or uppermost flip-flops in the three registers composing each register column being tied to the first or lowermost flip-flops in the three registers composing the next shift register column, as indicated by the arrows A and B. In the register column 70, a total of nine (3 × 3) different digital brightness bits will be accumulated.

According to the present invention, the information contained by the first three flip-flop trios in each of the columns 66 and 68 are sampled to permit so-called black/white decisions to be made. In the illustrative example, flip-flop trios 66a–66c, 68a–68c and 70a–70c in the enhancement register 38 are sampled to provide the required data. The black/white decision logic of the present invention makes black/white decisions based on the center bit value (68b) and the surrounding data along with a center threshold value. In particular, the following eight groups of flip-flop trios are sampled for their blackness information and then compared one against the other to determine whether the sampled information possesses the required blackness value: flip-flop trios 66a–66c, 68a–68c, 70a–70c, 66a, 68a and 70a; 66b, 68b and 70b; 66c, 68c and 70c; 66c, 68b and 70a; 70c, 68b and 66a.

The set or one sides of the flip-flop trios extending in the eight above-identified directions are coupled by way of a cable 72 to a resistor summing network 74 wherein the outputs from the eight groups of flip-flop trios are separately added to provide analog sum signals S1-S8 representative of the magnitudes of the brightness digital data bits in the eight directions. In addition, the outputs from the flip-flops comprising the center bit flip-flop trio 68b are connected directly to a pair of comparators 76 and 78. In the comparator 76, the value of the center bit digital data bits is compared against a black level signal. If a center bit value is very dark (octal value of 00 or 01) comparator 76 assigns a black value without testing background or center threshold. The output of the comparator 76 is coupled to one input terminal of an OR gate 80. In the comparator 78, the center bit value is compared against a modified black level signal to provide a high output signal for center bit values of 000–101 (0 to 5). The output of the comparator 78 is connected to one input terminal of AND gate 82.

From the resistor summing network 74, the eight analog sum signals are carried separately to a comparator circuit 84. In addition, the sum signals S1, S2, S3 and S4 representative of the analog values of the black data in horizontal, vertical and diagonal lines through the matrix center are compared against a center bit threshold value set by the computer 20 within a comparator 86. The comparator 86 provides a high output if the analog value of the black data of any one of sum signals S1–S4 is less positive than the center bit threshold value set by the computer. Comparator 84 provides a high output if the black values contained in either the horizontal, vertical or diagonal lines through the matrix center are less positive than the black values contained in a horizontal line contained above or below the matrix center and the values contained in a vertical line to the left or right of the matrix center.

The output terminals of the comparators 84 and 86 are supplied to the two remaining input terminals of the AND gate 82. AND gate 82 will supply an output when each of the comparator circuits 78, 84 and 86 supplies an output signal indicative of the presence of a predetermined black value i.e., that the value of the center bit is within a predetermined black range 000–101, that the value of the blackness within lines drawn through the matrix center is less than a predetermined threshold value, and that the value of such blackness is less than the blackness of the surrounding flip-flop trios drawn along vertical and horizontal lines about the matrix center. The OR gate 80 transmits a positive (black) signal in response to a positive signal supplied thereto by either the comparator circuit 76 or the AND gate 82.

PERIMETER TRACE PROCESSOR

Figure 5A:
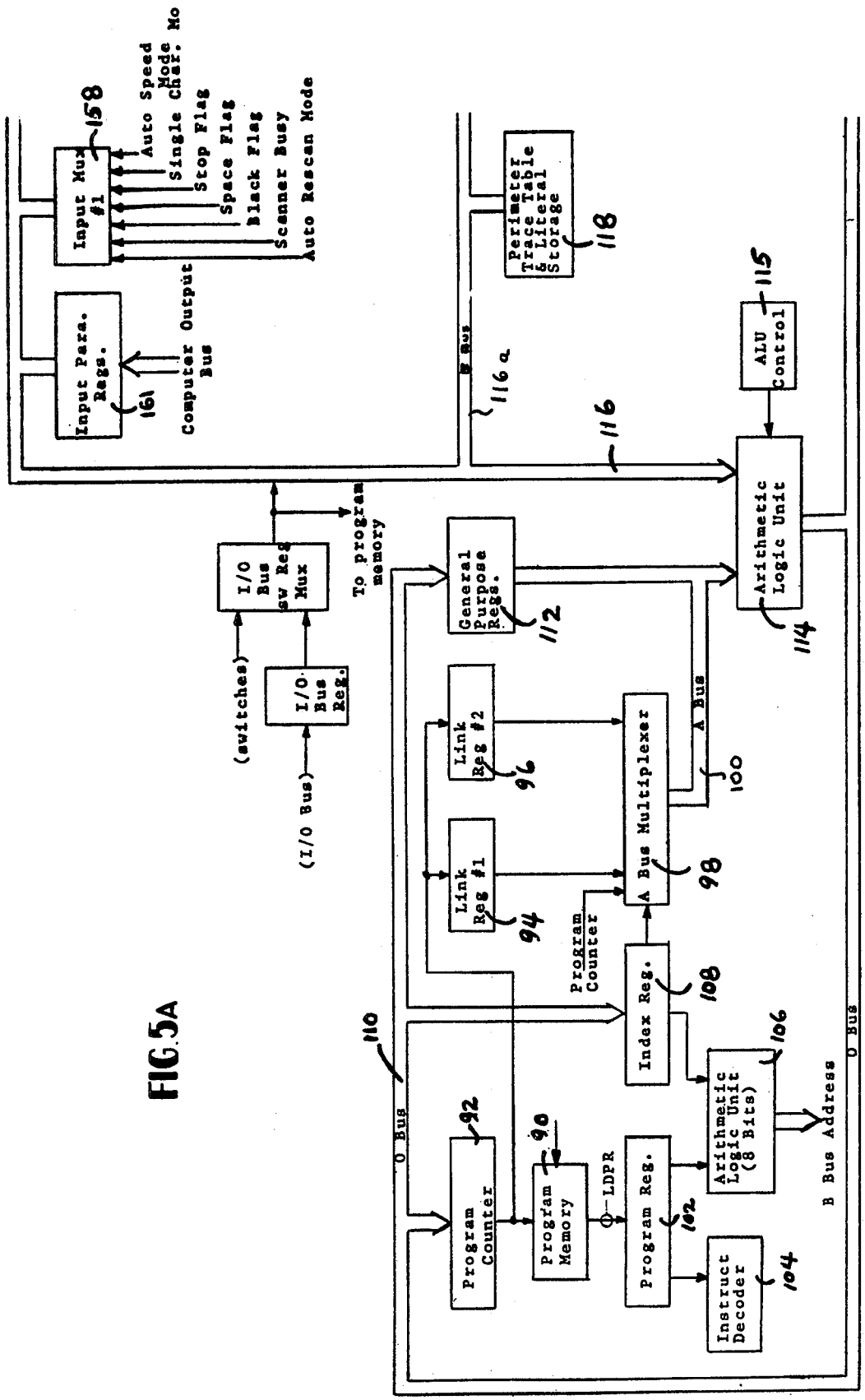
FIG. 5 is a schematic block diagram of a typical perimeter trace processing logic network included within the system of FIG. 1.
Figure 5B:
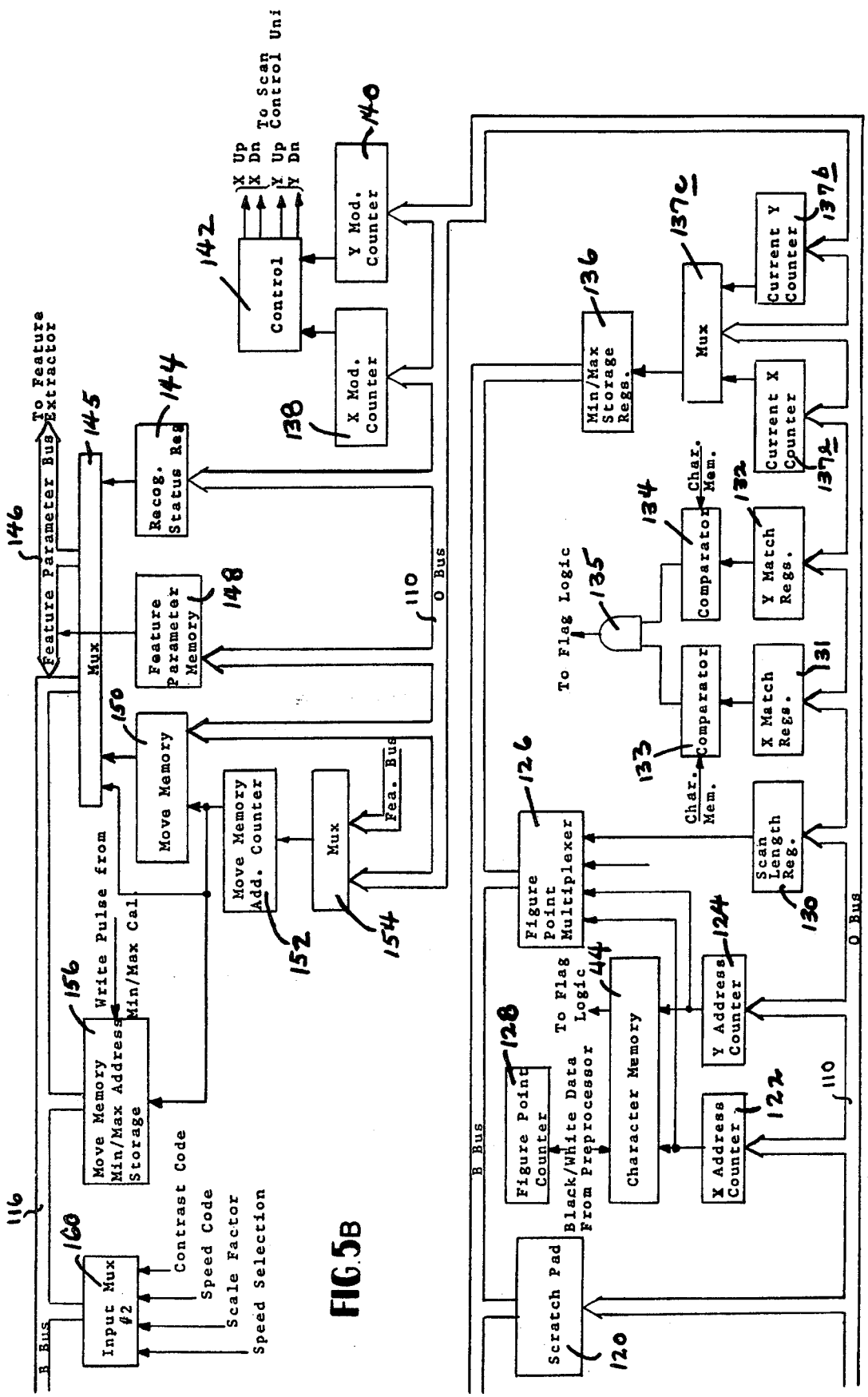

The perimater trace processor 42 of FIG. 1B, shown in greater detail in FIGS. 5A and 5B is a highspeed, special purpose digital processor, designed for tracing the contour of multi-font characters, especially hand printed characters. The processor is organized on a bus structure and its operation is controlled by a program residing in its program memory. Upon receiving read commands from the control computer the perimeter trace program initiates a contrast measurement of the character to be read (FIG. 2), then initiates the scan operation for reading the character data into its character memory. When a character has been read into character memory the trace program initiates a contrast measurement for the next character and begins contour tracing of the current character. When contour tracing is completed the contour data, along with other pertinent data and status information, is transferred to a feature extractor and scanning of the next character is begun.

Referring now to FIG. 5, a program memory 90 stores the instructions of the perimeter trace program and a program counter 92 supplies the addresses for the program memory 90. Normally, the program counter contents are incremented with each cycle of the perimeter trace clock (not shown), for example, every 300 nanoseconds. However, execution of so-called branch instructions (described hereinafter) can result in loading a new address value in order to jump from one program subroutine to another. Two of the branch instructions cause the contents of the program counter 92 (the address of the instruction following the branch) to be stored in a pair of link registers 94 and 96. This provides a means to return to the subroutine. The contents of the program counter 92 are also available via an A-Bus multiplexer 98 and an A-Bus 100 for storage in other areas.

Instructions read from the program memory 90 are stored in a 16 bit program register 102. The instructional contents of the program register 102 are decoded by the instruction decoder logic 104 which initiates execution of the specified operations. The address contents of the program register are supplied as an address field of instructions to one input terminal to a B-Bus arithmetic logic unit 106 (ALU) 106. An index register 108 comprising, for example, a 12 bit register, is used primarily for indexing B-Bus addresses by adding the contents of the register 108 to the addresses in the ALU 106. The index register 108 may be used as a general purpose register because it can be loaded via a so-called O-Bus 110 and its contents may be read via the A-Bus 100 through the multiplexer 98. Only the low order eight bits of the register are required for indexing purposes.

The link registers 94 and 96 are two, 12 bit registers used for two special branch instructions to store the return address. They can be loaded only through execution of the branch and link instructions, but their contents may be read without restriction via the A-Bus 100. Further provided are four general purpose 12 bit registers 112 available for general program use which can be loaded via the O-Bus 110 and read out via the A-Bus 100.

Also included is a 12 bit arithmetic logic unit 114 with control unit 115 whose inputs are supplied by the A-Bus 100 and a B-Bus 116 and whose output is available via the O-Bus 110. Unit 115 can activate the function-select leads of the ALU 114 under the control of the main program. The contents of the A-Bus 100 or the B-Bus 116 may be transferred to the O-Bus 110 without modification or their contents may be ANDed, inclusively ORed, complemented, compared, shifted right or left one bit position, added or subtracted. Appropriate flag functions are set or cleared as the result of the operations of the arithmetic unit 114.

The B-Bus 116 is coupled along a branch Bus 116a to a perimeter trace table and literal storage table 118 which may store, for example, 128 eight-bit words. This memory or table 118 contains constants required by the tracing algorithm (described hereinafter) and its contents may be read out via the branch B-Bus 116a. A so-called scratch pad memory 120 with a high speed, solid state random access memory is provided for temporary storage. The capacity of memory 120 is 32 twelve bit words and data words can be written into memory via the O-Bus 110 and the contents of memory may be read out via the B-Bus branch 116a.

The character memory 44 of the perimeter trace processor is a random access memory used for storage of the black/white bits of the character being traced. The memory is logically arranged in a 48 by 64 matrix to store 48 data sweeps, each having 64 data points or scan units. Memory addresses are provided by two, 6 bit X and Y address counters 122 and 124. The Y-address counter 124 selects the bit position to be written while the X-address counter 122 selects one of the 48 sweep positions. The Y-address counter 124 is incremented as each scan unit of data is written while the X-address counter 122 is incremented by the program at the end of each sweep. Both counters may be loaded or incremented via the O-Bus 110 and their contents may be read out on the B-Bus branch 116a via a figure point multiplexer 126. The character memory 44 receives and stores the character data in the same sequence that it is scanned, i.e., the first sweep of data from the preprocessor is stored in the first 64 bit column, the second sweep in the next column, etc. The contents of character memory may be read out, a scan unit at a time, via the O-Bus 110. For diagnostic purposes, the character memory may be loaded and read out by the control computer 20.

A figure point counter 128 is a six stage binary counter which counts the number of figure points (black bits) contained in each vertical sweep. This counter is cleared at the beginning of each sweep and increments each time a black bit is written into the character memory. This counter is used to find the leading and trailing edges of the character when scanning. The contents of this counter can be read out via the B-Bus branch 116a.

A scan length register 130 is an eight bit register used for storing the vertical sweep length (6 bits) and scaling factor (2 bits). The register is loaded from the O-Bus 110 and its contents can be read out, via the figure point multiplexer 126 on the B-Bus branch 116a. The scan length register contents are also available in the preprocessor for setting the sweep gate length and controlling the sweep scaling logic.

There are further provided eight, 7 bit registers; four X match registers 131 and four Y match registers 132. These registers and their associated comparators 133 and 134, respectively, are used in determining when the trace has reached specified points. The contents of the selected match registers are compared with the character memory X and Y address counters 122 and 124. Four flags (flags 8, 9, 10 and 11) set within a logic circuit 135 indicate the result of four matches. The state of these flags may be tested through use of branch instructions. The match registers are loaded via the O-Bus 110. Eight, 8 bit registers 136 store the minimum and maximum character memory addresses to thereby describe the size of the character being traced. The registers 136 are updated automatically from the current X and Y address counters 137a and 137b (character memory address) through a multiplexer 137c, each time a delta X-Y number is written into the move memory (described hereinafter below). The contents of the registers 136 can be read out via the B-Bus branch 116a.

The perimeter trace processing unit further comprises X and Y address modification counters 138 and 140 which are two, 8 bit counters used to modify the X and Y address counters in the scan control unit 18 (FIG. 1) via a control unit 142. The Y modification counter 140 is used to correct the vertical start point of the scan between characters when it is determined that the character is high or low in the sweep. The X modification counter 138 is used to move the horizontal starting point of the sweep back one box space or for rescanning of a rejected character.

A recognition status register 144 is a 16 bit register used to pass status information to the feature extractor and to the control computer 20 (FIG. 1). It is organized as two 8 bit registers with individual addresses. The register may be loaded via the O-Bus 110 and read out via the B-Bus 116 via a multiplexer 145. The contents of the recognition status register 144 are available to the feature extractor via the multiplexer 145 and a feature parameter bus 146, and to the control computer 20 via the multiplexer 145.

A feature parameter memory 148 is a random access memory which stores parameters such as trace starting addresses, character position, and other pertinent data about the traced character which are required by the feature extractor. The memory may be loaded via the O-Bus 110 and read out via the B-Bus 116 and the feature parameter bus 146.

A move memory 150 is a random access memory which is ued for storing delta (change in) X and Y information describing the perimeter of the character being traced. This memory is loaded via the O-Bus 110 and may be read out via the B-Bus 116. The memory contents may be transferred to the feature extractor via the feature parameter bus. A move memory address counter 152 is an eight stage up/down counter which is also capable of parallel loading. The counter 152 may be loaded or incremented by the feature extractor when the feature flag is set (described hereinafter). The perimeter trace program can increment or decrement the address counter 152 or load the counter via the O-Bus 110 when the feature flag is cleared through a multiplexer 154. The address counter contents may be read out via the B-Bus 116 through the multiplexer 154. The feature extractor can access the contents of the address counter 152 via the feature bus when the feature flag is set.

Four 8 bit registers 156 store the maximum and minimum X and Y character memory addresses for the character being traced. The registers 156 are loaded from the move memory address counter and can be read out via the B-Bus 116.

A pair of input multiplexers 158 and 160 provide a path for transferring selected information from the control computer 20 (FIG. 1) and contrast measurer to the B-Bus 116 and four, 8 bit input parameter registers 161 store the parameters received from the control computer 20 (FIG. 1). Parameters stored are: box height, box spacing, guard spacing, and program entry commands.

The first main function of the perimeter trace processor is to acquire data for input to the character memory. The second main function is to generate a trace of the perimeter of that character and to store the incremental moves of that perimeter in the move memory 150 for subsequent processing. The output of the processor unit is transferred to the feature extractor, but the information is held in temporary storage and communicated by the feature bus 146. Registers connected to the feature bus which can be addressed by either the processor unit or the feature extractor include the move memory 150, the feature parameter memory 148 and the recognition status register 144.

The contents of the memories include the perimeter trace points of the exterior perimeter of the character (incremental moves from one perimeter point to the next). Also stored is information regarding the presence or absence of interior traces, the number of points stored in the move memory and other ancillary information needed by the feature extractor.

Figure 6:
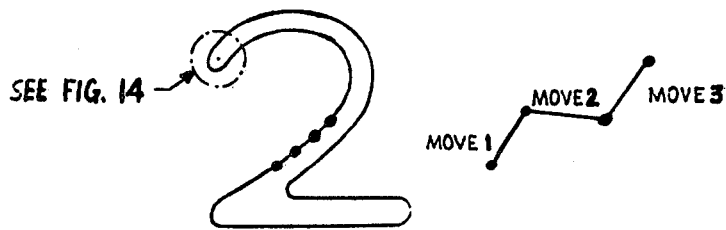
FIG. 6 is a graphic illustration of the number 2 useful in the explanation of the perimeter trace processing unit of FIG. 5.
Figure 7:
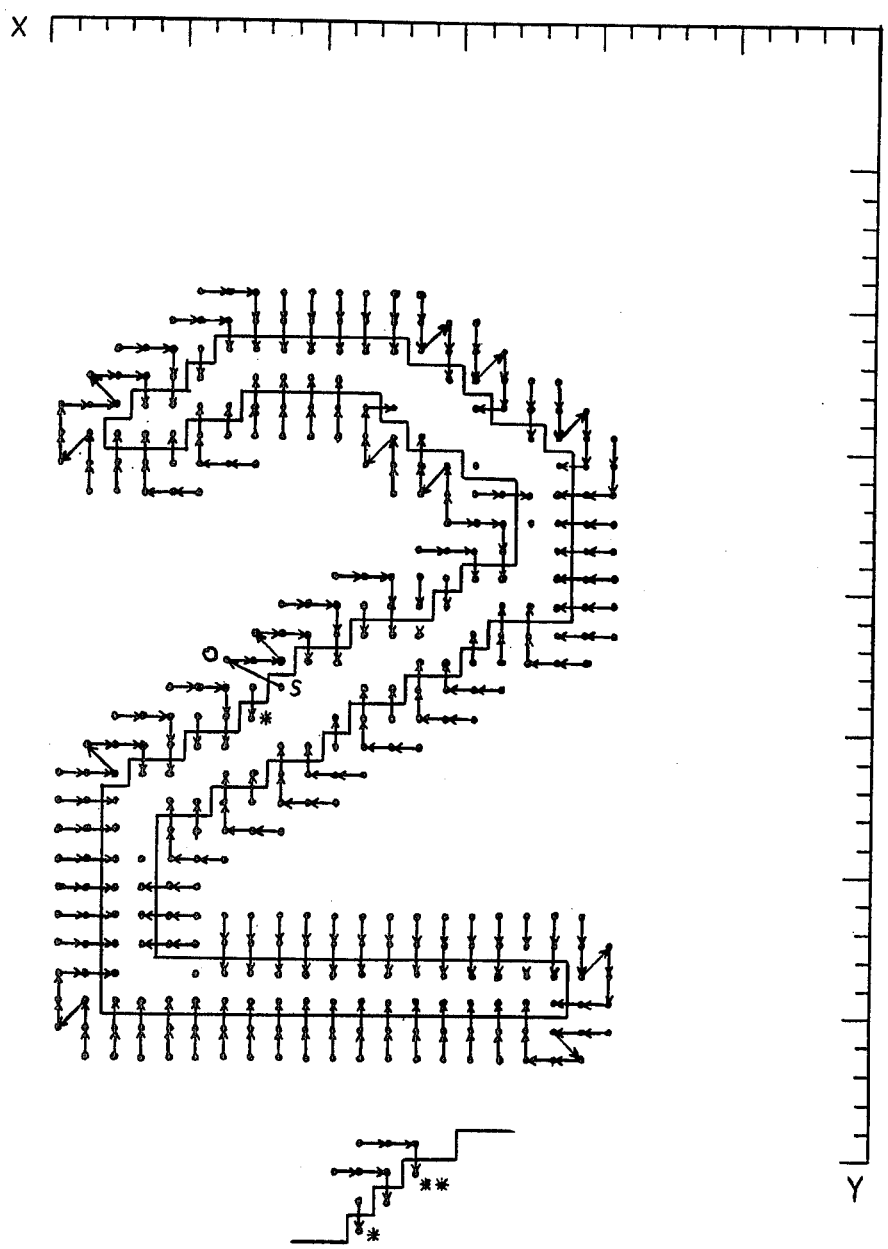
FIG. 7 illustrates the incremental moves involved in tracing the contour of the number 2.

An exaggerated example of what constitutes a perimeter trace point is shown in FIG. 6. The increments are plus or minus one scan unit or zero scan units away from the previous point. As shown in FIG. 6, the first move has increments plus 1 in the X direction and minus one in the Y direction. The coordinate system is such that positive increments for Y are from the top of the character to the bottom of the character. The move memory 150 is intended to store up to two exterior traces for one character. When more than one exterior trace occurs, a condition known as the split character condition exists. Generally, only one exterior trace will be found on a character. FIG. 7 shows the points stored in the character memory 44 which are accessed and tested in order to compute the points on the exterior of the character. The mechanism for accessing these points will be described below.

In addition to the points on the perimeter trace, the perimeter trace processor unit generates the following information: ⅜ and ⅝ boundaries which are Y coordinate values which are computed after the perimeter trace has been obtained. Information also obtained during the generation of the trace are the minimum Y value (top of the character) and the maximum Y value (bottom of the character). The minimum and maximum Y values are stored in the minimum/maximum storage registers 136 which are locations on the B-Bus. The contents of these registers are updated automatically during the generation of the perimeter trace.

The current X counter and current Y counter associated with these registers are used to hold the X/Y coordinates of the current point found in the operation of the perimeter trace. The current Y is compared with the previously found minimum Y value at each point and if found to be smaller replaces the previous minimum Y value. In addition, the current Y value is compared with the maximum Y value previously obtained and, if larger, replaces the previously stored value.

The arithmetic logic unit 114 takes information stored in the minimum/maximum storage registers 136 after the perimeter trace is completed and computes the difference between the minimum Y and the maximum Y and calls this the height of the character. The ⅜ boundary value is then computed by adding ⅜ of the character height to the minimum Y value. Similarly, the ⅝ boundary value is computed by adding ⅝ of the character height to the minimum Y value.

In addition to the incremental moves on each trace, other information is computed for each trace. In particular, there are computed the X/Y coordinate values of the initial point on the trace, detector length value which is used by the feature extractor to obtain features on that trace, and the address in the move memory of the last point of that trace. Data stored in the character memory 44 represent figure points (the black points of a character) and background points (the white points of the area around the character). The character memory 44 is filled during scanning of the character in such a way that the image of the character is stored in the character memory in a 1:1 correspondence with the position of the corresponding point of the page scanned. For each character, there is a vertical scan having a specified scan length. Scan length value is determined by the contents of the scan length register 130. The contents of the scan length register are computed under program control.

The search for the start point of the perimeter trace begins at the first column in the character memory at a Y value which is equal to the scan length divided by two. A search pattern consisting of consecutive moves from one column to the next interrogating the point in the column which has a Y value of one-half the scan length. These points are interrogated as to whether they are figure points (black) or background (white) points. If a black point is found, then the points in the immediate neighborhood of that black point are interrogated to establish whether such point is an isolated black point or a point on the boundary of the character. Each legitimate start point is stored on the feature bus and in the X match register and the Y match register 131 and 132, respectively, for use by the perimeter trace in determining the end of the trace operation. The detector length value for the first trace is computed as either the height of the trace or the width of the trace, whichever is greater. The width is computed in the same way that the height is computed and as described above. There are four possible detector lengths, each of which is proportional in value to the character height or character width if the width is larger than the height.

The X/Y start points, detector length and last move address for the second trace are computed in the same manner as for the first trace if a second trace is found. The second trace is found using a search pattern wherein points in two columns adjacent to the rightmost point on the first perimeter trace are scanned. This search is made vertically as opposed to horizontally, but any other searching pattern may be employed.

Information relating to the presence or absence of interior traces are also stored in a specified location in the feature parameter memory 148. Interior traces are similar to exterior traces except that they form a closed loop completely bounded by segments of the character. Points found on the interior trace are not stored in the move memory. It is sufficient to note the presence or absence of such traces for the purpose of recognition.

There are five possible outcomes of the interior trace searches: (1) none is found, (2) a single interior trace is found on the top part of the character, (3) a single interior trace is found in the middle of the character, (4) a single interior trace is found in the bottom of the character, and (5) an interior trace is found at the top of the character and an interior trace is found at the bottom of the character. The search for the top interior trace is done first.

Figure 8:
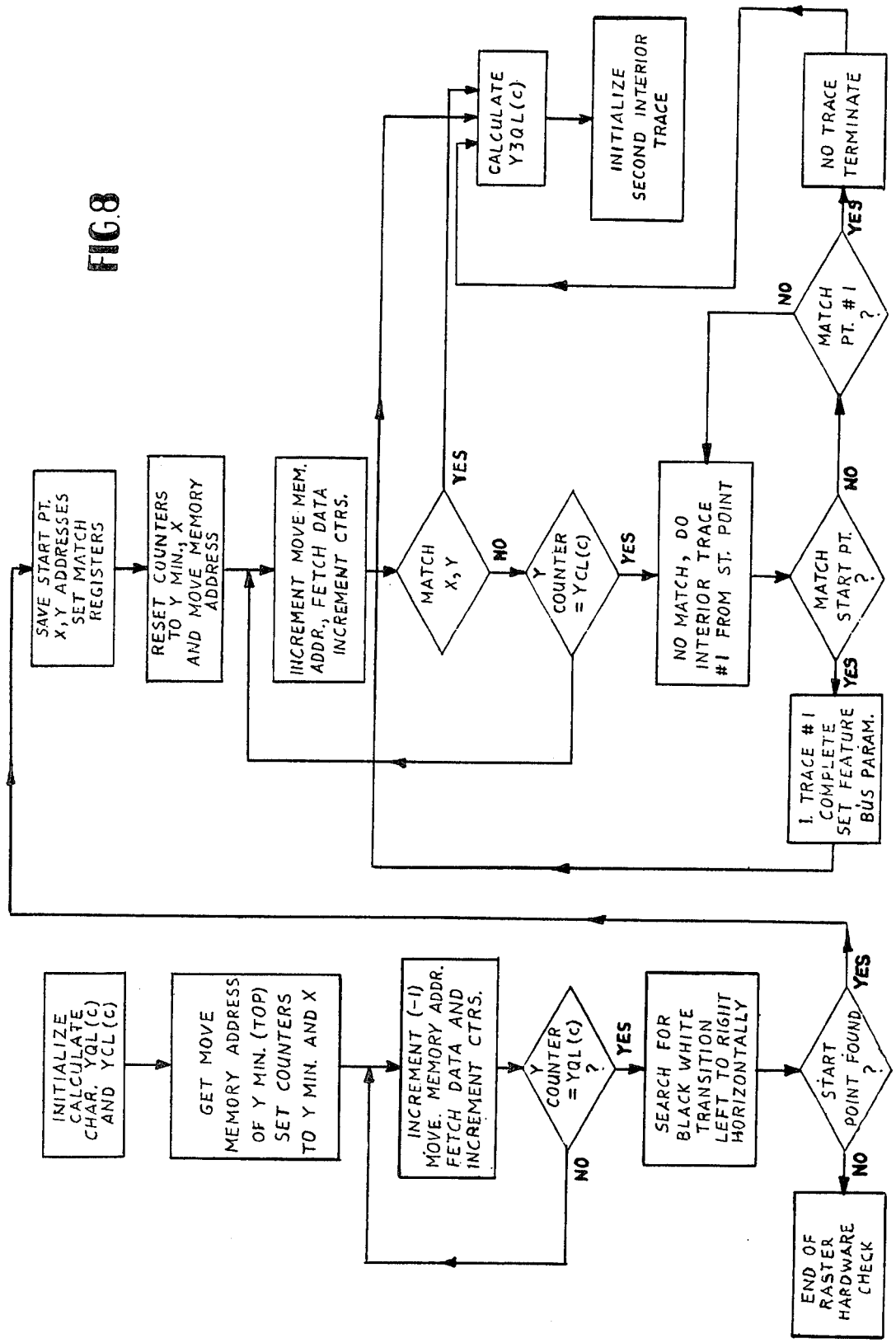
FIGS. 8–8B are flow charts useful in the explanation of the operation of the perimeter trace processor illustrated in FIG. 5.

In the flow chart shown in FIG. 8, the first operation for determining whether or not an interior trace exists at the top of the character involves the calculation of a Y coordinate value which is a quarter of the way down from the top of the character VQL (c). In addition to the quarter line value, the Y value which is halfway down the character VCL (c) is also computed. These values are used in subsequent parts of the interior trace search.

During the generation of the move memory data representing the exterior points of the character, the minimum Y values and maximum Y values of points on the exterior trace are obtained and stored in the minimum/maximum storage registers 136. In addition to the actual minimum/maximum values, the location of those points (the points having the minimum and maximum Y values) the location of such points in the move memory are stored in the separate move memory minimum/maximum address storage registers 156. This information is used to initiate the search on the exterior trace for a point which has a Y value equal to the sum of the Y minimum value plus ¼ the character height. This point is found by searching backwards from the point having the Y minimum value until the current Y value matches the previously computed ¼ line value VQL (c).

The next step in the interior trace search operation is to start at the ¼ line point on the exterior and search the content of the character memory 44 in a left-to-right search pattern for a black/white transition. This is a search for the other side of the character stroke from the side on which the exterior trace point having the ¼ line Y value was found. The third step in the interior trace search is to utilize the move memory data in a forward search starting again at the location in the move memory having the Y minimum value and searching to see whether the point found in the search step is also an exterior point. The third section of the search terminates when the Y value of the current point is equal to the mid character Y value previously computed. The fact that the point found after searching across the character stroke from points stored in the character memory 44 does not match any of the points found in the third part of the search does not necessarily mean that the point was the start point of an interior trace. However, if that point is found during the forward search from the Y mid point, then no exterior trace is construed to exist in the top part of the character.

The fourth step of the interior trace search from the top of the character is to do a perimeter trace operation starting at the point found in the second part of the search and continuing until either a point on the exterior is found or the initial starting point is found. If the latter is true, then an interior trace is said to exist in the top of the character. The tracing operation is implemented by using the contents of the character memory in the same way as would be done in tracing the exterior of the character.

On additional test is made during this trace operation. If the Y maximum value of the particular trace is more than ¾ of the way toward the bottom of the character, then the trace is said to be an interior trace in the middle of the character and no further searches for interior traces are made. If this latter condition fails the search for an interior trace in the bottom of the character is initiated. The search for an interior trace in the bottom of the character is identical to the procedure used for the search for an interior trace in the top of the character, except that the initial starting point having Y maximum value on the exterior is used instead of Y minimum and the ¾ line Y value is used instead of the ¼ Y value. The presence or absence and location of interior traces so found are used as additional features input to the classifier for the purposes of recognition and form an important part of the recognition process of the present invention, especially for the numerical characters 6, 8, 9 and 0.

Referring again to FIG. 5, the perimeter trace recognition status word is stored in the register 144. The status word comprises 16 bits, each of which having a specific significance. The contents of the status register 144 can be read directly by the control computer 20 (FIG. 1) and are used for diagnostic purposes and to detect special situations. These special situations are first recognized by the operation of the perimeter trace processor. The assignment of the significance of each bit is in correspondence to the coding of this program.

For example, the lowest order binary bits indicate the contrast code as determined by the contrast measurement. A second bit signifies that no character was found in character memory even though a raster scan occurred. A third bit signifies that the character is smaller than some arbitrary value. A fourth bit signifies that the trace of the exterior of the character intercepts the top of the character memory. If such condition occurs, it is necessary to rescan the character at a higher location on the page. A similar and fifth bit exists for the trace intercepting the bottom of the character memory.

Another sixth bit indicates that more than one character, usually one whole character and part of a subsequent character, were read into the character memory. This condition occurs when there is insufficient separation of the two characters with white or background points forming a column. The detection of two consecutive columns of scanned points having no black or figure points terminates the scanning of that particular character. The character memory is filled with data until an arbitrary number of vertical scans have been completed. This number usually corresponds to the physical limitations of the size of the character memory which, in a conventional application, is about 1½ box spacings. A box is the location on the page into which a hand print character may or may not be placed. Additional bits signify the existence of two or more valid exterior traces, one or more invalid traces, an isolated noise point, a move memory overflow condition and a hardware check condition.

Additional parameters stored in the feature parameter memory 148 are the delta X coordinate values and the delta Y coordinate values which are passed on via the feature extractor and the classifier to the control computer 20. Each character has associated therewith delta X and delta Y values. Delta X is the incremental distance between the left margin of the paper to the left margin of the detected character. Delta Y is the incremental distance between the initial point in the raster scan for the character and the line coordinate where the character is first detected. Another parameter which the control computer sets is the right margin. The right margin is the point beyond which no data is expected to be found for the particular paper or field. A field is defined as an area between the left margin and right margin of the paper and on a particular line coordinate where a certain character may exist. The term logical line is sometimes used for "field".

One of the functions of the perimeter trace processor program is to send over to the control computer a code signifying that the end of the logical line has been reached. The end of the line check first checks for end of line, too dark or space conditions. If the indication of adequate contrast occurs, the program will then initialize the character memory by setting up two columns of background or white points by issuing an insensitive scan command. This has the effect of causing two columns, columns 0 and 1, respectively, of the character memory to be filled with all background points and to initialize the registers of the preprocessing unit so that subsequent columns will have the proper enhancement. The character memory data for a particular scanned character must have a border of background points completely enclosing the scanned data in order for the perimeter trace operation, described below, to function properly. The top two rows are automatically set to white by the enhancement logic as are the last two points in each vertical scan as above-described. Because a white bar, i.e., two successive columns having no figure points, is the termination of scan condition these columns will serve automatically as the rightmost border of the data. In the event that no white bar occurs in the data scan, a preset white bar at the extreme right of the character memory is used.

After initialization, the next operation is a raster scan in which a left margin of the character is searched for. During this mode of scanning, a cumulative count of black points in the character is kept in counter 128 and, if the count exceeds a preset value, a character is said to exist and regular scanning is commenced and subsequently terminated.

During the left margin search, if a particular single vertical scan had no figure points or black points according to the figure point counter 128, then the X address counter 122 will not be incremented and thereby cause the subsequent single vertical scan to write over the contents of the previous scan. When the regular raster scan is completed, the perimeter trace processor calls for the issuance of a command to the contrast measurer to begin a contrast measurement in search of the next character. The next operation is the trace operation which is done simultaneously with the above-mentioned contrast measurement and will be described below. If a good character condition results from this trace, a vertical correction operation is performed for the scanning of the subsequent character.

The vertical correction is based on the position of the traced character in terms of its Y minimum value and Y maximum value relative to the value of the scan length divided by two, in other words the center line of the raster. If the character appears to be too high with respect to the raster, then the raster for the subsequent character will be raised according to the amount of this difference. If the character is found to be off raster, it will be rescanned. If, upon rescanning, the character is again found to be off raster, then the scan length would be increased by an amount equal to the box height parameter plus the guard space parameter, these parameters being set by the program residing in the control computer. The last operation is to transfer to the feature bus a good character code.

Figure 8A:
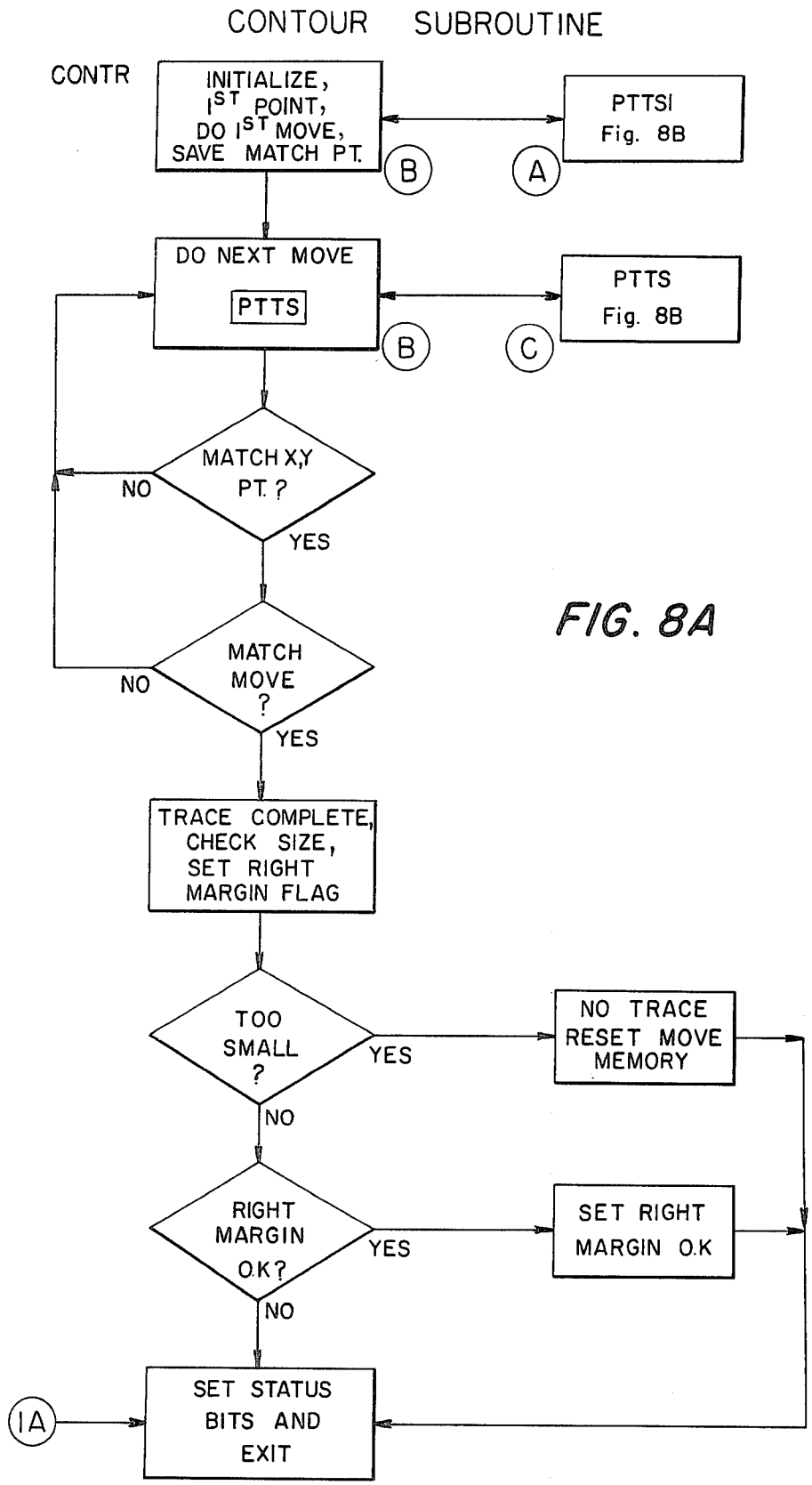
Figure 8B:
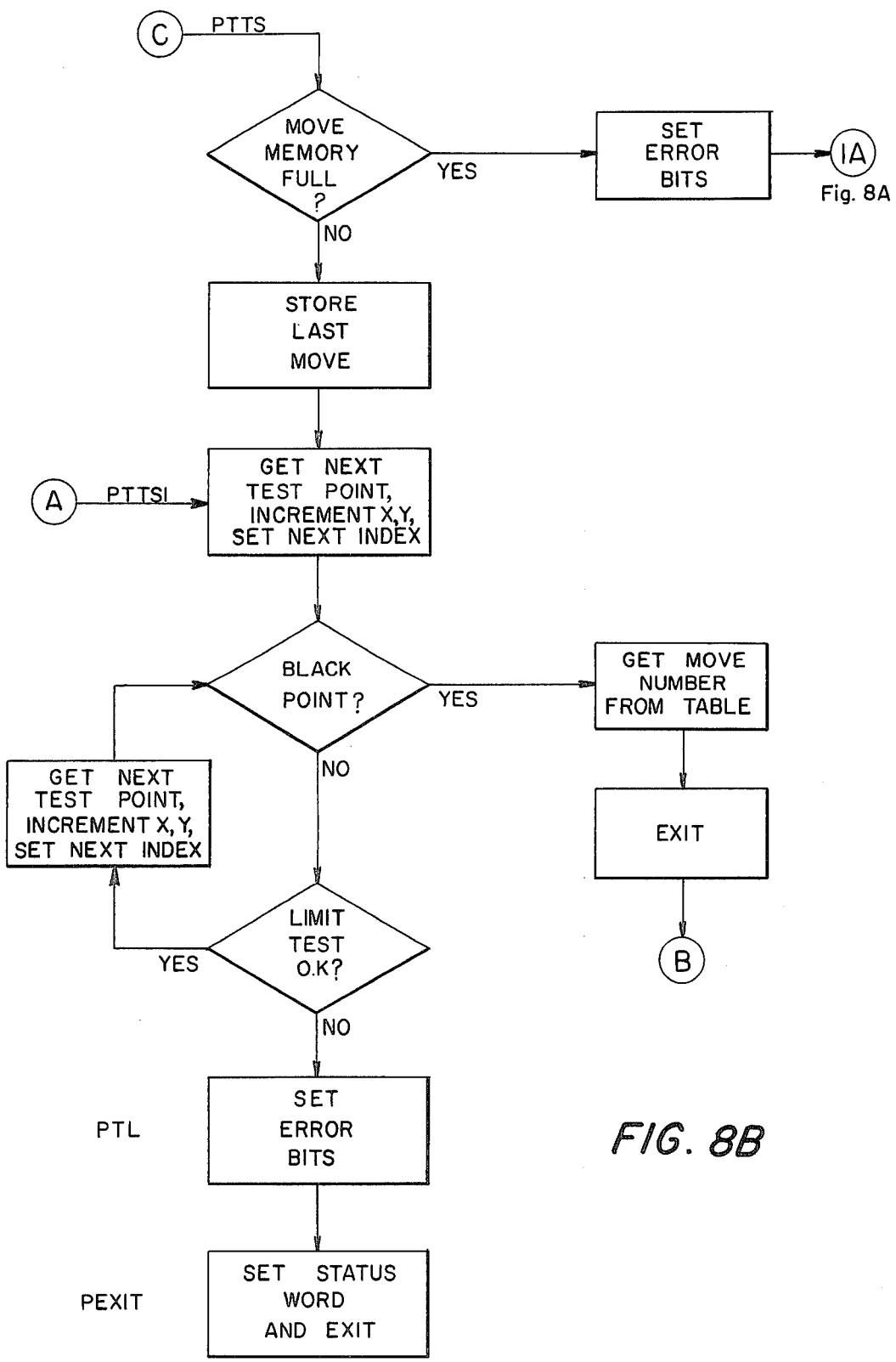

An important subroutine within the program is the trace subroutine, the operation of which will be apparent hereinbelow. The main function of the trace subroutine is to generate the move memory increments stored in the move memory 150 which correspond to the incremental values in X and Y going from one point on the perimeter trace to the next point on the perimeter trace. The subroutine shown in FIG. 8A and its subroutine shown in FIG. 8B search the contents of the character memory beginning at the start point as described above. The first thing which the trace subroutine does is to check to see whether or not the feature extractor has finished using the information stored on the feature bus. When the feature extractor has released control of the feature bus, the control is given back to the perimeter trace processor unit and the trace operation initializes certain scratch pad memory locations 120 for the subsequent trace operation. The trace operation utilizes a unique contour following algorithm. It looks in the vicinity of the point which it just found on the previous move in a search of the character memory data accessed and tests each of these data points to determine whether it is a white point or a black point. The sequence of the search is shown below.

As an example of this search pattern, FIG. 7 shows the points in the character memory accessed and tested for the handdrawn number 2. The start point labelled S assumes a previous move to it from a point directly beneath. The general mode of operation of the search pattern is to interrogate points from left-to-right immediately in front of the point just found to be on the perimeter so that the first point to be interrogated is two points to the left and one point above the start point as shown in FIG. 7. This corresponds to the point of the search pattern labelled 0. In this case, the point is a background or white point and the search for the next move must continue. The new point in the character memory to be interrogated is obtained from information stored in the perimeter trace table. The contents of this table, as well as an explanation of the use of the data, and an illustration of the search pattern are as follows:

TABLE I

| | | | PERIMETER TRACE TABLE | | | | |
|---|---|---|---|---|---|---|---|
| LOC. | POINT | CONT | FUNCTION | LOC. | POINT | CONT | FUNCTION |
| 00 | 0 | 010 | x,y +1,0 | 50 | 8 | 001 | x,y 0,+1 |
| 01 | | 005 | Next x,y | 51 | | 055 | Next x,y |
| 02 | | 077 | M.N. −1,−1 | 52 | | 010 | M.N. +1,0 |
| 03 | | 000 | Pos 0,0 | 53 | | 007 | Pos 0,−1 |
| 04 | | 125 | Next x,y | 54 | | 031 | Next x,y |
| 05 | 1 | 010 | x,y +1,0 | 55 | 9 | 001 | x,y 0,+1 |
| 06 | | 012 | Next x,y | 56 | | 062 | Next x,y |
| 07 | | 077 | M.N. −1,−1 | 57 | | 010 | M.N. +1,0 |
| 10 | | 061 | Pos −2,+1 | 60 | | 006 | Pos 0,−2 |
| 11 | | 132 | Next x,y | 61 | | 031 | Next x,y |
| 12 | 2 | 077 | x,y −1,−1 | 62 | 10 | 070 | x,y −1,0 |
| 13 | | 017 | Next x,y | 63 | | 067 | Next x,y |
| 14 | | 007 | M.N. 0,−1 | 64 | | 011 | M.N. +1,+1 |
| 15 | | 067 | Pos −2,−1 | 65 | | 000 | Pos 0,0 |
| 16 | | 000 | Next x,y | 66 | | 043 | Next x,y |
| 17 | 3 | 010 | x,y +1,0 | 67 | 11 | 070 | x,y −1,0 |
| 20 | | 024 | Next x,y | 70 | | 074 | Next x,y |
| 21 | | 007 | M.N. 0,−1 | 71 | | 011 | M.N. +1,+1 |
| 22 | | 070 | Pos −1,0 | 72 | | 027 | Pos +2,−1 |
| 23 | | 000 | Next x,y | 73 | | 050 | Next x,y |
| 24 | 4 | 010 | x,y +1,0 | 74 | 12 | 011 | x,y +1,+1 |
| 25 | | 031 | Next x,y | 75 | | 101 | Next x,y |
| 26 | | 007 | M.N. 0,−1 | 76 | | 001 | M.N. 0,+1 |
| 27 | | 060 | Pos −2,0 | 77 | | 021 | Pos +2,+1 |
| 30 | | 000 | Next x,y | 100 | | 062 | Next x,y |
| 31 | 5 | 001 | x,y 0,+1 | 101 | 13 | 070 | x,y −1,0 |
| 32 | | 036 | Next x,y | 102 | | 106 | Next x,y |
| 33 | | 017 | M.N. +1,−1 | 103 | | 001 | M.N. 0,+1 |
| 34 | | 000 | Pos 0,0 | 104 | | 010 | Pos +1,0 |
| 35 | | 012 | Next x,y | 105 | | 062 | Next x,y |

TABLE I-continued
PERIMETER TRACE TABLE

| LOC. | POINT | CONT | FUNCTION | LOC. | POINT | CONT | FUNCTION |
|---|---|---|---|---|---|---|---|
| 36 | 6 | 001 | x,y 0,+1 | 106 | 14 | 070 | x,y −1,0 |
| 37 |  | 043 | Next x,y | 107 |  | 113 | Next x,y |
| 40 |  | 017 | M.N. +1,−1 | 110 |  | 001 | M.N. 0,+1 |
| 41 |  | 076 | Pos −1,−2 | 111 |  | 020 | Pos +2,0 |
| 42 |  | 017 | Next x,y | 112 |  | 062 | Next x,y |
| 43 | 7 | 017 | x,y +1,−1 | 113 | 15 | 007 | x,y 0,−1 |
| 44 |  | 050 | Next x,y | 114 |  | 120 | Next x,y |
| 45 |  | 010 | M.N. +1,0 | 115 |  | 071 | M.N. −1,+1 |
| 46 |  | 016 | Pos +1,−2 | 116 |  | 000 | Pos 0,0 |
| 47 |  | 031 | Next x,y | 117 |  | 074 | Next x,y |
| 120 | 16 | 007 | x,y 0,−1 |  |  |  |  |
| 121 |  | 125 | Next x,y |  |  |  |  |
| 122 |  | 071 | M.N. −1,+1 |  |  |  |  |
| 123 |  | 012 | Pos +1,+2 |  |  |  |  |
| 124 |  | 101 | Next x,y |  |  |  |  |
| 125 | 17 | 071 | x,y −1,+1 |  |  |  |  |
| 126 |  | 132 | Next x,y |  |  |  |  |
| 127 |  | 070 | M.N. −1,0 |  |  |  |  |
| 130 |  | 072 | Pos −1,+2 |  |  |  |  |
| 131 |  | 113 | Next x,y |  |  |  |  |
| 132 | 18 | 007 | x,y 0,−1 |  |  |  |  |
| 133 |  | 137 | Next x,y |  |  |  |  |
| 134 |  | 070 | M.N. −1,0 |  |  |  |  |
| 135 |  | 001 | Pos 0,+1 |  |  |  |  |
| 136 |  | 113 | Next x,y |  |  |  |  |
| 137 | 19 |  | x,y 0,−1 |  |  |  |  |
| 140 |  |  | Next x,y |  |  |  |  |
| 141 |  |  | M.N. −1,0 |  |  |  |  |
| 142 |  |  | Pos 0,+2 |  |  |  |  |
| 143 |  |  | Next x,y |  |  |  |  |
| END OF TRACE DATA |  |  |  |  |  |  |  |

The format for each of the 19 trace sequences is as follows:

| Location | Function |
|---|---|
| XXX | Character memory address increments to move to next point if current point is white. |
| XXX+1 | Index for next address increments if current point is white. |
| XXX+2 | Move number to be stored if current point is black. |
| XXX+3 | Character memory address increments to start search for next black point (if current point is black). |
| XXX+4 | Index for next address increments if current point is black. |

```
              3    4    5
         0    1    2    6    8
        19   17    B    7    9
        18   16   12   11   10
             15   14   13
            SEARCH PATTERN
```

Since point 0 of the search pattern is being scanned and such point is found out to be white, location 00 of the perimeter trace table indicates the increments in X and Y which are to be added to the current X and Y addresses to obtain the address of the point to be interrogated next. This turns out to be a point which is just to the right of the previous point having an X increment plus 1 and a Y increment of 0. This point also turns out to be white.

As seen in the search pattern the next point is point number 1. We now look in the perimeter trace table for information relative to point number 1. Because it is a white point as seen in FIG. 7, location 05 is addressed. This address indicates that the next increments in X and Y are again plus 1 and 0, respectively. When these increments are added to the current X and Y memory addresses, the next point interrogated will be point corresponding to the number 2 position of the search pattern. As seen in FIG. 7, this is also a white point. According to Table I, the next x and y increments are -1 and -1, respectively. The next point interrogated is number 3 of the search pattern which is also white. Similarly, points 4 and 5 are also white.

The X and Y increments from point number 5 are 0 and +1, respectively, so that the next point to be interrogated is immediately below number 5. This point, number 6 on the search pattern, turns out to be black. Having found a black point, the corresponding incremental moves are stored in the move memory. Only moves involving plus or minus or zero values or increments in X and Y coordinates are allowed. Thus, even if the first black point found is more than plus or minus one units away from the previous black point in either the X or Y directions, the subsequent move stored in the move memory is only plus or minus one, or zero as the case may be.

The particular move memory increment to be used is also indicated in the table associated with point 6. The move number to be stored is found at location 40 and is +1 in X and −1 in Y. Having found a black point and stored the move number or move increments in the move memory, the search pattern is now considered to be centered around the new point on the perimeter. Location 41 specifies the increments in the character memory address which are now used to initiate the next search pattern. Table I and FIG. 7 show that a negative increment in X of 1 and negative increment of Y of 2, when added to the current character memory addresses, determine the location of the first point to be accessed and interrogated for determining where the X point on the perimeter trace exists. This point corresponds to number 3 in the search pattern. This turns out to be a white point, as are points 4, 5 and 6. Number 7 is the first black point. Referring to the perimeter trace table, the table indicates that the associated move number or move increment is +1 in X and 0 in Y. These values are stored in the move memory; the search pattern is adjusted to its new position and the search for the next point is commenced.

The first point to be accessed in finding the next point of the perimeter trace is, according to the table, +1 in X and −2 in Y away from the point just found. In this case, the point corresponds to number 5 in the search pattern. As shown in FIG. 7, this is a white point which directs the search to the point below or number 6 on the search pattern. This is a black point and the corresponding move number, as found in the perimeter trace table, at location 40 is +1 in X and −1 in Y. Subsequent moves are found in a similar manner.

At each point, a check is made to see whether the operation of tracing the exterior trace should be terminated. In addition to checking to see whether the accumulated values of the increments add up to 0 in X and 0 in Y, which is another way of testing to see whether the current point is the same point as the start point, the direction of the move to that point must be the same as the initial move direction. This consideration is necessary in situations where the character is only one point thick where one may arrive at a start point on the other side of the character from which it was started.

FEATURE EXTRACTOR

The feature extractor transforms the points on the perimeter of a character into a list of welldefined features if they exist on that character. The classifier subsystem described hereinafter will then use such detailed features to determine the proper category, or class, of the character being recognized. In addition to the detection of such features, the feature extractor passes on to the classifier additional information which the perimeter trace processor derived during the generation of the perimeter trace. The list of these items and their different positions are found in Table II set forth below.

Figure 9:
FIG. 9 illustrates the features detected by the present invention which may be combined to define a character.
Figure 9:
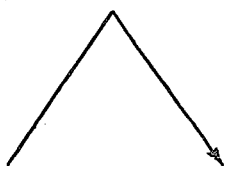
Figure 9:
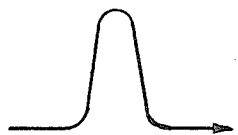
Figure 9:
Figure 9:
Figure 9:
Figure 9:
Figure 9:

A feature is a major characteristic of a numeric or alphabetic character. The shape of the features which are parts of the perimeter trace of the exterior of the character are shown in FIG. 9. There are basically two types of features, convex features and concave features. Convex features generally have the same direction as the exterior trace. Concave features tend to have the opposite direction. Convex features include spur, wedge, short spur, short arc and arc. Concave features include bay and cusp. One feature which is neither convex nor concave, is a straight line. It has been found that all legible characters can be defined using combinations of the above-mentioned features.

Figure 1C:
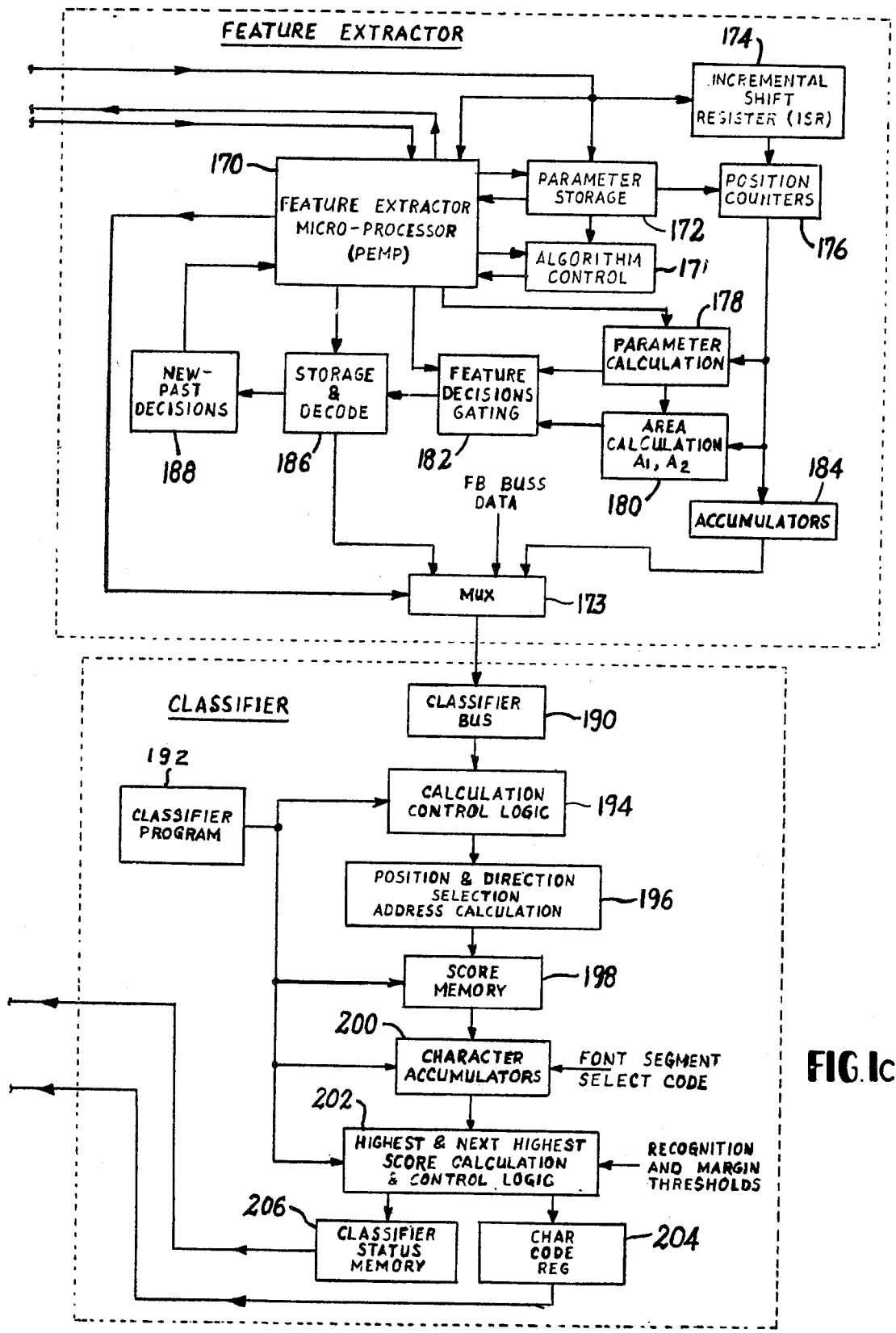

The feature extractor shown in FIG. 1c is controlled by a microprocessor 170 which, in turn, is controlled by an algorithm control unit 171. The program for this microprocessor, which is a sequential logic device, such as is generally described in Microprograming: Principles and Practices by Hasson, Prentice Hall, is stored in a read only memory and will be described below. The program implements an algorithm for finding, sorting and sending feature codes and associated data to the classifier subsystem. The parameters calculated by the perimeter trace processor are stored in parameter storage logic 172. Some of the parameters are passed on directly to the classifier [as indicated by the labelled conductor] via a multiplexer 173 and some are used by the microprocessor. A portion of the exterior trace is stored in an incremental shift register 174. A decision as to the presence or absence of a feature, i.e., a feature indication, is computed at each point on the perimeter trace. When the computation for one such point is terminated the contents of the incremental shift register will be displaced by one position to receive the next point from the move memory 150 by way of the feature bus.

The arc segment contained in the incremental shift register is sampled at five locations. The actual coordinate values of these locations are regenerated in position counters 176 for subsequent processing. Parameters based on distances between these points and combinations of these points are calculated in the parameter calculation logic 178 which includes digital accumulators and arithmetic logic units (ALU's). In addition to the distance calculation, local areas bounded by these five points are calculated in the area calculation logic 180 that also includes digital accumulators or ALU's. The parameters and area calculation are used by the feature decision gating logic 182 to determine the presence or absence of a feature at a particular point. If features do exist, then position information regarding these features are accumulated in accumulators 184. The current feature indication is paired with the indication or absence of an indication at the previous point in storage and decode logic 186. This pairing of features determines the action which the microprocessor 170 takes on the new or current feature. If the action is to terminate the detection of a specific feature, which may have several feature indications, the feature type is encoded in the logic 186 and the data accumulated in the accumulators 184 is sent to the classifier subsystem. Decisions as to the features encoded are computed in a new-past decision memory logic network 188 and transmitted to the microprocessor 170. The process repeats for all features on a character. Termination of this process for a given character is based on recognition by the feature extractor microprocessor 170 that the initial feature indication previously found has been found again. The program can be divided into eight major sections, as shown in the flow charts of FIGS. 10–13. The sections run in a time sequence; upon completion of one section, another section begins execution.

Figure 10:
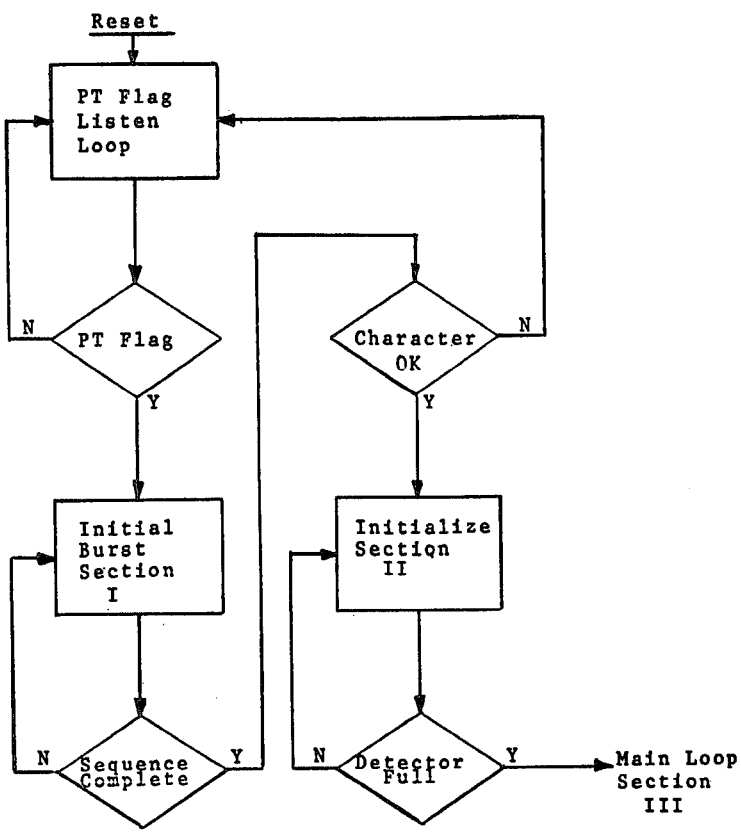
FIGS. 10–13 are flow charts useful in the explanation of the feature extractor subsystem included within the system of FIG. 1.
Figure 11:
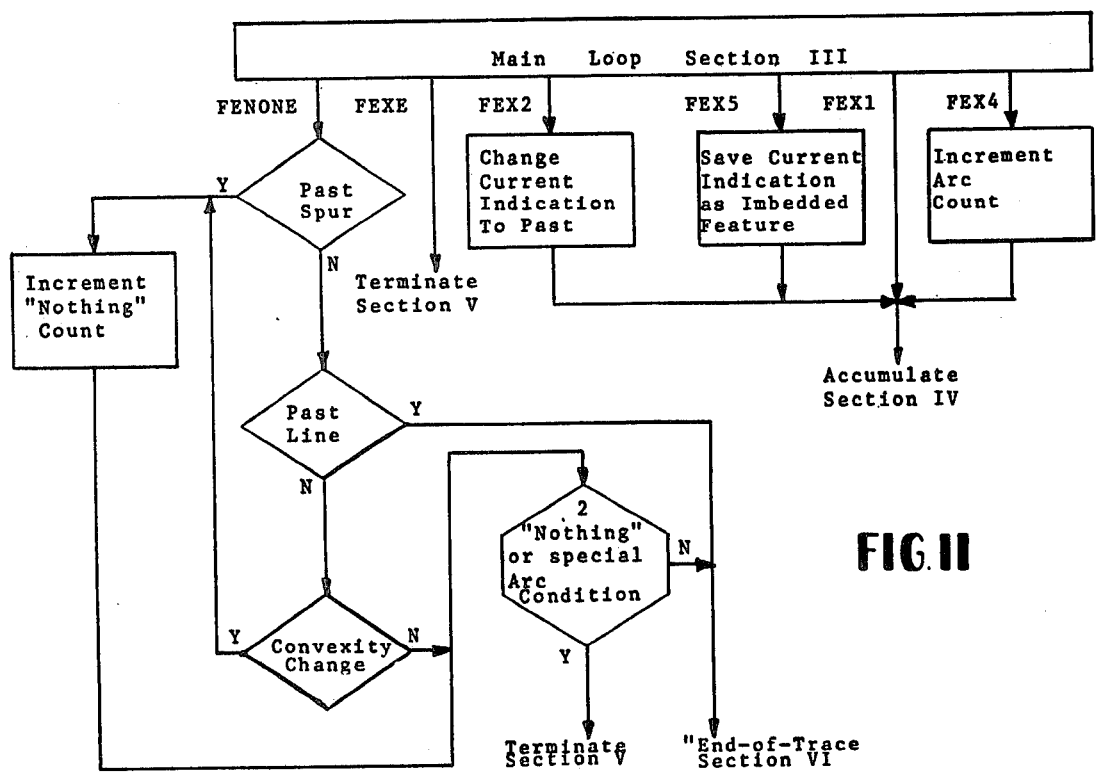

Referring to FIG. 10, the microprogram initially checks the condition of the perimeter trace flag (PTFLAG) in a flag check loop. This is always the condition of the feature extractor microprocessor during power up, reset, or extraction complete. When the perimeter trace processor 42 has completed its task, the perimeter trace flag is set. This condition triggers the feature extractor microprogram to enter the first major section: initial burst.

A special operate group instruction executed by the miroprocessor 170 starts a data transfer sequence. During this transfer sequence, data is obtained from the feature bus 164 of the perimeter trace processor and is transferred to the storage registers 172 within the feature extractor (See FIG. 1). Some of this data is "tagged" by its feature bus address so that its transfer to the classifier can take place.

Instruction execution in the microprocessor halts until all data of the burst, i.e., all data stored in the feature bus has been transferred. Data transfer to the classifier is as follows: (1) data is presented to the classifier, (2) the data ready flag is set (FEDR), (3) the classifier, noting the state of data ready flag, accepts the data and clears the flag, and (4) the microprocessor 170 proceeds to the next data word on the feature bus or to "transfer complete". At "transfer complete", the microprocessor executes the next sequential instruction from its memory. The feature bus requires an address code to obtain data. This code is generated by a register within the microprocessor 170. The transfer operation loads this register with the lowest address of the burst data. After each transfer, the register value is incremented by one. When the address is advanced beyond the last data word of the burst, the transfer generator finishes and returns control to the microprocessor. Initial burst data, bus address, and destination are shown in Table II.

TABLE II

| BURST DATA | F. BUSS ADDRESS | DESTINATION FE | CL |
|---|---|---|---|
| Character type | 00 | x | x |
| ⅋ boundary | 01 | x | |
| ⅋ boundary | 02 | x | |
| #1 x start | 05 | x | |
| #1 y start | 06 | x | |
| #1 det length | 07 | x | |
| #1 last move adr | 10 | x | |
| Int trace data | 11 | | x |
| #2 last move adr | 13 | x | |
| #2 x start | 15 | x | |
| #2 y start | 16 | x | |
| #2 det length | 17 | x | |
| -(move data) | 20 | | |
| -(move adr) | 21 | | |
| PT Recog. status (LH) | 22 | | x |
| PT Recog. status (RH) | 23 | | x |
| Δx (RH) | 24 | | x |
| Δx (LH) | 25 | | x |
| Δy | 26 | | x |
| (transfer complete) | 27 | | |

At the completion of initial burst, the microprocessor 170 checks the character type code picked up from the perimeter trace processor. A non-zero code indicates one of the following conditions: (1) error in perimeter trace processor or (2) special character i.e., space, end-of-line, etc. A zero code indicates a complete perimeter trace. Thus, the microprocessor 170 attempts to perform feature extraction when it finds these codes by entering the second major section, a so-called initialize section.

A series of microcommands are executed by the microprocessor 170 which initialize various logic sections (area calculation, position accumulators, etc.) and registers (incremental shift register, control flags, etc.). The microprogram then enters the initialize loop which loads the incremental shift register 174 with move increments until it is "full". The number of load the incremental shift register loops is a function of the detector length, that is, for example, a 20 unit detector will cause the miroprogram to loop for 20 times. Feature extraction can proceed only after detector initialization. Incremental area calculations described hereinafter occur during the initialize loop. The third major section or main loop section (FIG. 11) is entered upon completion of initialize.

The output of the incremental shift register 174 is used to derive five detector position points defined by x and y coordinates which form the basis for calculating feature parameters, position accumulations and enclosed area. Feature parameters, enclosed areas and constants related to detector length are combined in the feature decision gating logic 182 (FIG. 1) to produce the feature indications shown in FIG. 9.

At the beginning of the main section, the status of the feature indication lines are strobed into storage latches. The new past feature decisions logic 188 contains gating circuits that compare new indications with past indications. Particular new-past sequences generate signals that are sampled by branch instructions within the microprogram. The branches direct the program flow to such sections as: terminate, accumulate, nothing, etc (See FIG. 11). The following chart lists the sequence signal mnemonics and the microprocessor's course of action:

| Signal Mnemonic | Microprogram Action | Notes |
|---|---|---|
| FENONE | process "nothing" | No indication as a result of strobe |
| FEXE | terminate | Accumulated feature string to present point ended |
| FEX1 | accumulate | Accumulate position data of new indication to past indication position data |
| FEX2 | current←past, accumulate | Change new indication code to code of past feature and accumulate position |
| FEX4 | feature counter←+1, accumulate | Advance count of feature counter by 1 and accumulate |
| FEX5 | save feature, current←past, accumulate | Store new indication and proceed as in FEX2 ("imbedded" feature) |

Figure 12:
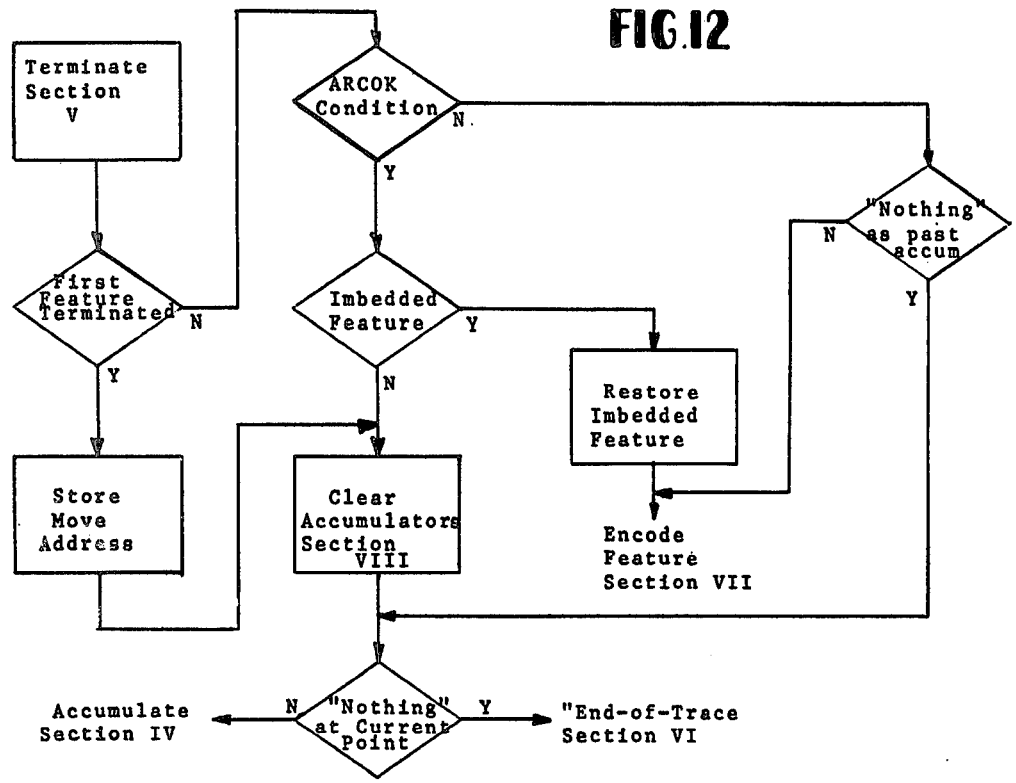
Figure 13:
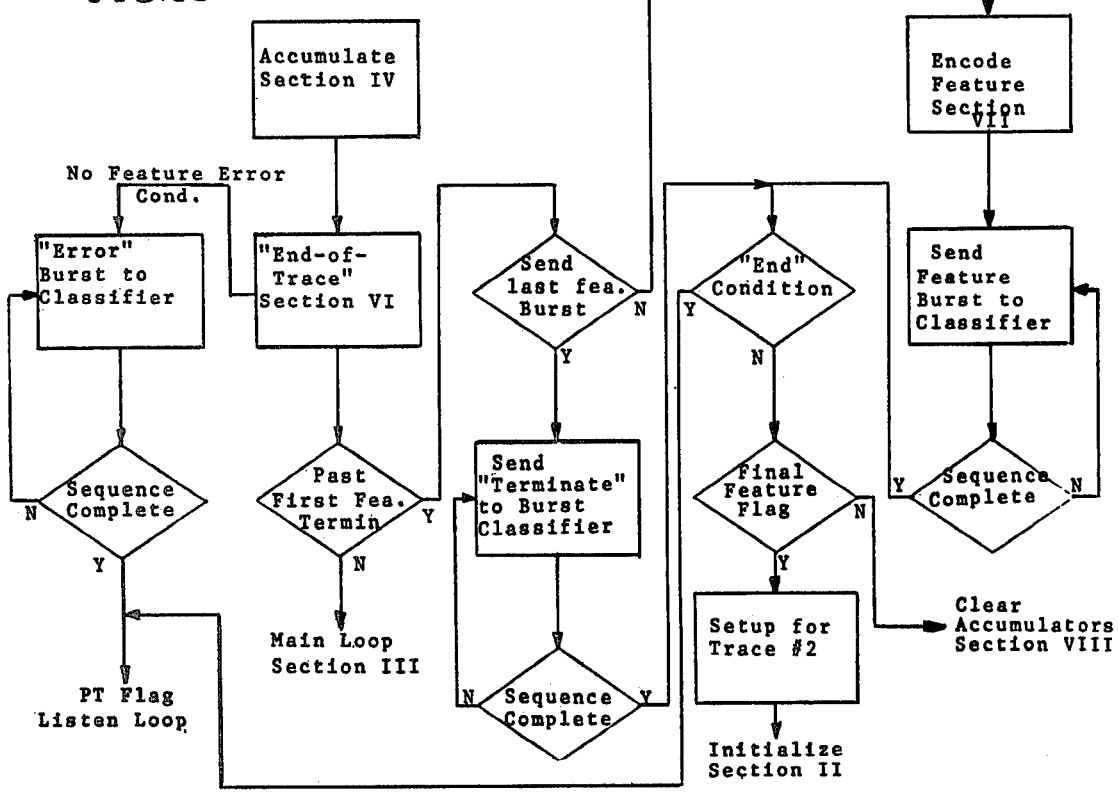

If no feature indication occurs, the program branches to check for several past feature sequences and a convexity check. The first past sequence checked is "spur". If "spurs" have occurred, the "nothing counter" is incremented and checked for a count of two. If two "nothings" have followed a "spur", the microprogram branches to the "terminate" section (FIG. 12). If not, the microprogram branches to the "end-of-trace-check" loop (FIG. 13). The second past feature sequence checked is "line". If "lines" have occurred, the microprogram branches directly to "end-of-trace-check" (FIG. 13). If no previous "spur" or "lines" have occurred, the trace convexity is tested. If a change in convexity has occurred, the "nothing counter" is incremented and checked. If two nothings follow a convexity change, the microprogram branches to the "terminate" section (FIG. 12).

A convexity change occurs when the direction of curvature of the middle section of the arc segment contained in the incremental shift register changes by a sufficient amount. If all three initial tests in the FENONE branch fail, an occurrence of two nothings or a past "arc" occurring at a particular place on the trace can cause the microprogram to branch to "terminate". Failure of all FENONE loop tests results in branching to "end-of-trace-check".

A terminate condition can occur with certain feature indication sequences. Such sequences can occur if the feature indication at the current point (new indication) is different from an indication that has been accumulated (past indication). Such a sequence condition is best expressed in a complement form, that is, if a feature is present at the current point and no other conditions are true (FEX1, FEX2, FEX4, FEX5), then FEXE will be true.

If the FEX1 condition is true, then the "accumulate" section, FIG. 13, is entered. The sequences causing FEX1 to be true consist of particular pairings of new and past indications, as listed in Table III below. This table shows a representative set of pairings. It will be understood that the use of such pairs is not limited to those shown in the following Table III.

TABLE III

| Past Accumulated Feature Indication | Required Current Indication for Accumulation |
|---|---|
| spur | |

TABLE III-continued

| Past Accumulated Feature Indication | Required Current Indication for Accumulation |
|---|---|
| wedge short spur short arc bay | spur |
| cusp wedge short spur short arc wedge | bay |
| | short arc |
| short spur line | wedge line |
| "nothing" | first feature flag |

If the FEX 2 condition is true, then the "accumulate" loop is entered after the current indication has been changed to be the same as the accumulated past indication. Such a condition with the following feature indication sequences:

| Past Accumulated Feature Indication | Required Current Indication for Accumulation |
|---|---|
| spur | short arc |
| spur short arc bay | wedge |
| cusp spur wedge short spur short arc | cusp |
| | short spur |

The FEX4 branch is a special branch that is used to process "arc" indications. The FEX4 condition is true if the current indication is an "arc", the past accumulated indication is also an "arc" except when at certain terminate locations. If condition FEX4 is true, the microprogram increments the arc-count register (FCTR) and branches to "accumulate".

The FEX5 branch is a special branch that is used to save imbedded features (short arc, wedge) occurring within a string of accumulated "arcs". FEX5 is true if the indication at the current point is a "short arc" or a "wedge" and the past accumulated indication is "arc". If FEX5 is true, the microprogram saves the current indication (FECA) in a 'save' register, changes the current indication to the past accumulated indication and branches to 37 accumulate".

Four microoperations occur in the accumulate section (FIG. 13) before the microprogram enters "end-of-trace-check". These operations are (1) Past accumulated feature is changed to current indication; (2) "Nothing counter" is cleared; (3) Feature bus address set to access move memory address" for "end-of-trace-check"; (4) The accumulators 184 are updated. Inputs to the accumulators are a function of the past accumulated features. The table below lists the source of accumulator inputs as a function of past features:

| Accumulator | Spur, Bay, Wedge, Arc Small Arc | | Line | Short Spur, Cusp | |
|---|---|---|---|---|---|
| BX | B2X | | B2X | B2X | |
| BY | B2Y | | B2Y | B2Y | |
| DX | $\frac{A2X+C2X}{2}$ | (same as D2X FIG. 14) | A2X | $\frac{A1X+C1X}{2}$ | (same as D1X FIG. 14) |
| BY | $\frac{A2Y+C2Y}{2}$ | (same as D2Y FIG. 14) | A2Y | $\frac{A1Y+C1Y}{2}$ | (same as D1Y FIG. 14) |

Figure 14:
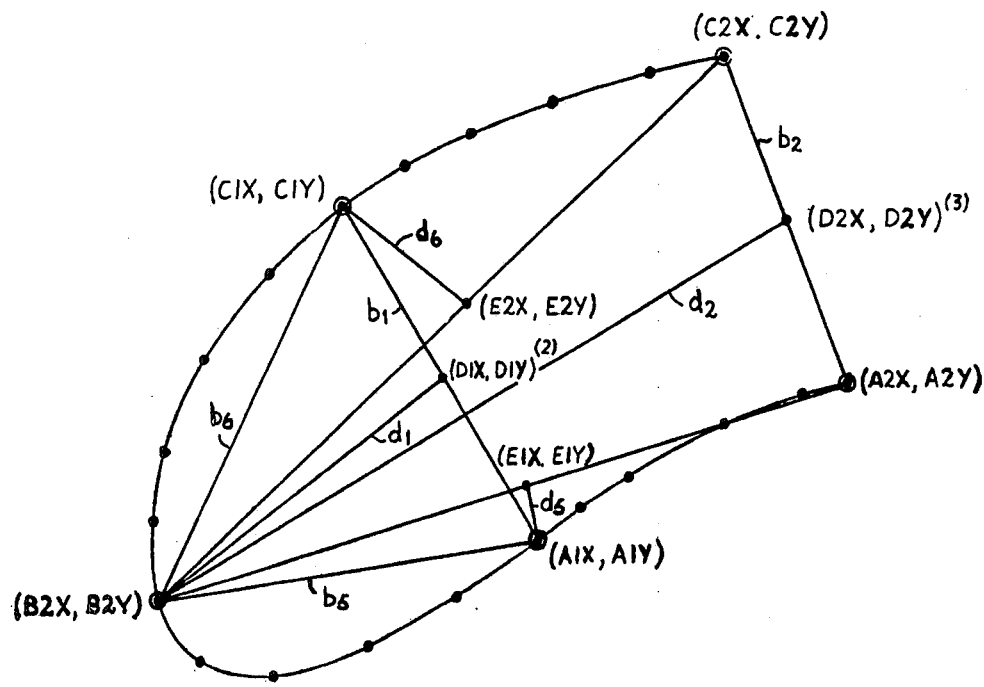
FIG. 14 illustrates the parameters and areas forming the spur which terminates the number 2 illustrated in FIG. 6.

The values listed in the above tables, which are used to add to the accumulators 184 for subsequent use by the classifier are obtained from the position counters 176. The position counters hold X and Y coordinate information for five points on the arc segment stored in the incremental shift register 174. The location of these five points are shown in FIG. 14. FIG. 14 shows the tip of the number 2 illustrated in FIG. 6. The enlarged portion of the trace located in an area near the first spur shows the five samples points for a detector length of 20. The detector length value is determined by the perimeter trace processor and passed to the feature extractor as one of the feature bus parameters. Lengths such as 12, 16 and 24 are also possible.

Points A1, A2, B2, C1 and C2 are actual points on the arc segment stored in the incremental shift register 174. D1 is a point located midway between points A1 and C1. Similarly, D2 is a point located midway between points A2 and C2. Points B2, D1 and D2, in their X and Y coordinate values, are accumulated as shown in the above table. Additional points E1 and E2 are midway between points A2 and B2, and C2 and B2, respectively. These points are used in the computation of the parameters used in the feature detection logic.

A microcommand execution at the start of the "initialize" loop sets a flag, known as the "first feature flag", to the "one" state. When the terminate loop is entered for the first time, the state of this flag is checked. Since the check is affirmative at the first terminate point, the microprogram proceeds to store the move memory address of the current point in a storage register. This value of move memory address is used by the "end-of-trace-check" to end the trace, i.e., tracing will continue around the character until the first feature terminate point is reached for the second time.

Figure 15:
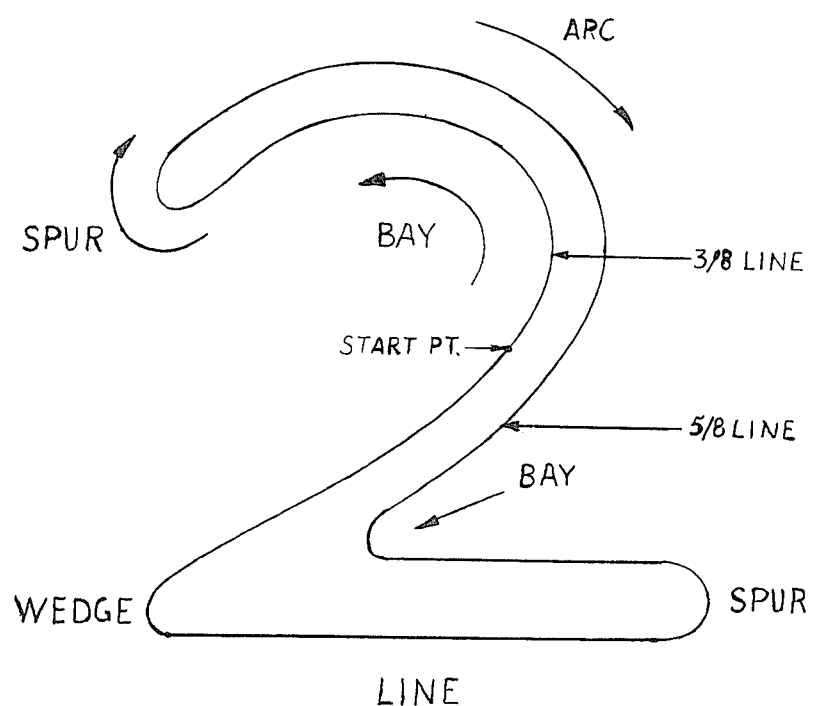
FIG. 15 illustrates the features which define the number 2.

As shown in FIG. 15, the number 2 comprises certain feature types and the sequence of detection of those feature types is as follows:

| Feature Found | Terminated By | Sent to Class |
|---|---|---|
| Bay | Spur [1] | No |
| Spur | Arc | Yes |
| Arc | ⅜ line crossing | Yes |
| Arc | Bay | No [2] |
| Bay | Spur | Yes |
| Spur | Nothing [3] | Yes |
| Line | Nothing | Yes |
| Wedge [4] | Nothing [5] | Yes |
| Bay | First Feature Terminate | |

[1] The spur indication also serves as the first feature terminate point.
[2] Indication is not sent since there is an insufficient number of indicators. The test is applicable only to an arc feature. All other features require only an indication at a single point on the perimeter.
[3] No feature is detected for at least two points.
[4] A wedge indication at or following a short spur will have higher priority.
[5] Could also be terminated by a change in convexity.

As shown in FIG. 12 the microprogram branches to "clear accumulators" after loading the current point in the storage register. If the first feature flag is false, the microprogram checks the arc OK ("ARCOK") condition which is true if all of the following are true: (1) there is a past "arc" accumulation and (2) the feature counter is less than the detector length divided by two. Since this condition is only checked within the terminate section, the function can be true only if one of the following preceding conditions was true: (1) two past "nothings" accompanied by a convexity change, (2) the occurrence of a spur, cusp, short spur, line or bay indication at the current point, (3) there is an "arc" indication at the current point but (i) the trace is crossing the ⅜ boundary or, (ii) the trace is crossing the ⅝ boundary and there is no imbedded feature.

Assuming ARCOK is true, the microprogram then checks for the presence of an imbedded feature. If there is no imbedded feature, the microprogram branches to "clear accumulators", otherwise it loads the past decision register 188 (FIG. 1) with the "saved" indication and branches to "encode feature". If ARCOK is false, the microprogram checks the state of "past nothing" condition. This condition can occur as a result of "initialize" or "clear accumulator". If "past nothing" is true the microprogram sets the feature bus address to a predetermined address so that the state of the move memory address can be tested in "end-of-trace", and proceeds to test the state of "current nothing". If there exists a "nothing" indication at the current point, the routine branches to "end-of-trace-check", otherwise, it branches to "feature accumulate".

The first operation executed by the microprogram in the end-of-trace section routine strobes the results of comparisons between the current move memory address and the stored values of "last move address" (obtained during "initialize") and the move address of the first feature into latches. Next, it increments the counter used during "initialize". The first pass through this loop will see the counter go from a count of $37_8$ (the count value at the end of "initialize" in base 8) to $00_8$. Under this condition, further increment commands are blocked from advancing the count. This condition will persist until the counter is reloaded. Following the increment command, the microprocessor checks the state of the counter for the value: $37_8$. Since the count is changed to zero during the first pass and remains so for subsequent passes, the microprogram finds the counter value of $37_8$ to be false. The test on $37_8$ can be true, however, under conditions described below. If the test on $37_8$ is false, the microprogram tests the latch containing the result of the move memory address - last move address compare. If this latch is true, the trace has advanced to the end of the move data and the move memory address must be reset to the beginning for proper operation to continue. At the same time, the move memory address is reset, the counter is reloaded with the negative value of the detector length.

The counter is used to insure that the trace "wrap around" the character by at least an amount equal to the detector length before checking to see if any features have occurred on the trace. If the count $37_8$ is true, a selected bit of first feature address is checked by the microprogram. If the bit is set then, at least one feature terminate occurred during the trace. If the bit is false, a "no feature error condition" exists and a branch to a transfer data instruction occurs. The transfer of a feature extractor error burst to the classifier is initiated. The burst consists of two 16 bit words, a feature extractor error code and a terminate code.

At the completion of transfer, the perimeter trace flag is cleared and the microprogram branches to the flag check loop to wait for next character data from the perimeter trace processor. Assuming that the count does not equal $37_8$ and the past last location test has been acted upon, the microprogram then checks the "past first feature terminate point" latch. If the latch is true then the trace has "wrapped" around the character up to the first terminate point and the microprogram sets the "final feature" flag and checks to see if the final feature has been encoded by testing a logic function which is true if a "clear accumulators" had occurred during the previous two moves. When a final feature was encoded, then a "terminate" burst is sent to the classifier and the routine branches to the "END" loop. If not, the routine branches to "encode feature".

If the trace is not at the first feature address, the microprogram resets the feature bus address to permit move memory data to appear on the bus data lines, resets the ⅜ and ⅝ boundary crossing latches, resets the "first feature" flag only if the first feature address has been found, executes an incremental area calculation and branches back to "main loop" to process the next point.

The first microoperation of the encode feature section consists of a transfer instruction that initiates a "feature burst" to the classifier and transmits the accumulated values of BX, BY, DX, DY, ⅜, ⅝ and the feature code corresponding to the type feature recognized to the classifier. An eighth word in the burst is possible if the logic condition "END" is true. This function is true if the "final feature" flag is set and the "X" start point of trace 2 is zero. At the completion of the burst transfer, the microprogram tests the state of END. If END is true, PTFLAG is cleared and the routine branches to the flag check loop to wait for next character data from the perimeter trace processor. If END is false, the microprogram tests the state of the first feature flag. If this flag is true, then the processing of trace 2 can be initiated. This condition causes the microprogram to clear a so-called "trace" flag so that trace 2 constants can be available to the hardware and then the routine branches to "initialize". If the first feature flag is false, the microprogram branches to "clear accumulators".

The first program of the clear accumulators performs the function of clearing all the registers within the feature extractor. The second microprogram operation sets the feature bus address to a predetermined address so that the move memory address will appear on the feature bus data lines for use by the "end-of-trace-check" routine. The microprogram then checks to see if there is a "nothing" indication at the current point (FENONE). If FENONE is true, then the routine branches to "end-of-trace-check" otherwise it branches to "feature accumulate".

Referring now to FIG. 14, there are shown eight parameters $d_1$, $d_2$, $d_5$, $d_6$, $b_1$, $b_2$, $b_5$ and $b_6$ in addition to the five points on the arc segment stored in the incremental shift register 174. These parameters are distances between the five points A2, A1, B2, C1 and C2, and the midpoints D1, D2, E1 and E2. If certain tests involving comparisons of these parameter values are satisfied, the corresponding feature indication will occur. For example, a spur indication requires that the parameter value $d_2$ be larger than the parameter value $b_2$. A further requirement is that $b_2$ and $b_1$ be smaller than some constant related to detector length. Similarly, an arc indication requires that $b_2$ be large in comparison with $d_2$, because an arc is a feature which has a larger radius of curvature than does the spur.

In addition to the distance parameters, incremental areas are also used to determine the presence or absence of a feature at a particular point on the exterior trace. There are two incremental areas calculated. The first one, A1, is bounded by all the points on the arc segment between the points A1 through and including B2 to the point C1. Area A2 is defined as that area enclosed by all the points on the arc segment between A2, through B2, to C2 and a straight line segment joining C2 and A2. These areas can be either positive or negative. If the values computed are positive, the feature is said to be convex. If the values of the area are computed to be negative the features are said to be concave.

The calculation of the distance between two points is an approximation of the standard Euclidean distance, the latter being the square root of the sum of the squares of the X and Y components of a vector originating at one point and terminating at the other. The approximation used computes distance by first obtaining the absolute value of the X and Y components, determining which component is larger in absolute magnitude and summing the value of the larger component to some fraction, e.g., ⅜ of the value of the absolute magnitude of the smaller component. This approximation has sufficient accuracy for this application and obviates the need of complicated square root and multiplier functions.

The incremental area calculations are based on the so-called planimeter method of computing area. The planimeter method of computing area obtains an area of calculation by tracing the perimeter of the enclosed area and adding Y values for plus increments of X and subtracting Y values for negative increments in X. To eliminate the need to compute the area for the entire local perimeter, which perimeter defines the area as described above, the computation is done on an incremental basis and an area is updated as a new point is added to the incremental shift register and the point on the other end of the arc segment stored in that shift register is removed. To generate an initial value of area, this same process occurs during the initialization section except that no points are being removed from the incremental shift register at this phase.

CLASSIFIER

The handprint option classifier is designed to perform a series of operations on data supplied to it by the feature extractor via the classifier bus 190. As above described, this data includes a feature code designating the type of feature which has been extracted and accumulations of position information relating to that feature. The data for each feature is accumulated by the feature extractor at each point on the perimeter associated with that feature and is used by the classifier to calculate position and direction of the feature.

As shown in FIG. 9, there are 8 possible regular features. The classifier selects the correct direction and position for each feature out of 8 possible directions and 3 possible positions. This totals 192 unique regular feature combinations. Additionally, there are 4 possible lake (interior trace) features and 8 possible special features (set forth below). The present system is intended to recognize characters having the shape of prototype characters in a selected hand print set (see FIG. 20), although different systems may be used. A partial score is associated with each combination for each prototype character in the handprint set. These partial scores are in the range of −7 to +7 and are based on the probability of the prototype having the particular feature combination in question. The scores are stored in a score memory table. Each prototype is also given a constant partial score (offset) in an attempt to normalize the results in relation to an expected number of features.

The classifier attempts to recognize characters utilizing what is known as a linear discriminant function. A score representing the sum of the partial scores for each feature combination present is accumulated for each prototype. The function for the nth prototype is as follows:

$$\text{Score} = W_{on} + F_1 \cdot W_{in} = \ldots + F_m \cdot W_{mn} + \ldots + F_m \cdot W_{mn},$$

where $F_m$ has a value of 1 or 0 indicating that the feature is present or not present and where W is the partial score given to each character for the particular feature present. $W_{on}$ is the offset for the nth prototype.

The prototype having the largest score is selected as the best match for the total set of features generated by the trace for a given figure. The character class code associated with this prototype is made available for transfer to the control computer. If the highest score is less than the recognition threshold or if the difference between the highest score and next highest is less than a margin threshold, a reject code is made available.

The classifier shown in FIG. 1C comprises a classifier bus 190 forming a buffer between the feature extractor and the classifier and a preprogrammed computer comprising a memory 192 for storing the classifier program. As will be described in greater detail hereinbelow with reference to flow charts, the program controls the operation of calculation control logic 194, position and direction selection and address calculation logic 196, a score memory 198, character accumulators 200 and highest and next highest score calculation and control logic 202. Like the algorithm control 171 and the microprocessor 170, the calculation control logic 194 decodes the instructions of the classifier program 192 and generates the necessary data transfer and register control signals necessary to perform these instructions. Also, the position and direction selection address calculation circuit 196 comprises digital comparators which determine the 3/5 and ⅝ positions, and the direction of the features. The highest and next-highest score calculation and control logic 202 is a magnitude comparator, such as a digital comparator, that compares the outputs of the character accumulators 200 with the recognition thresholds from the control computer.

Figure 16:
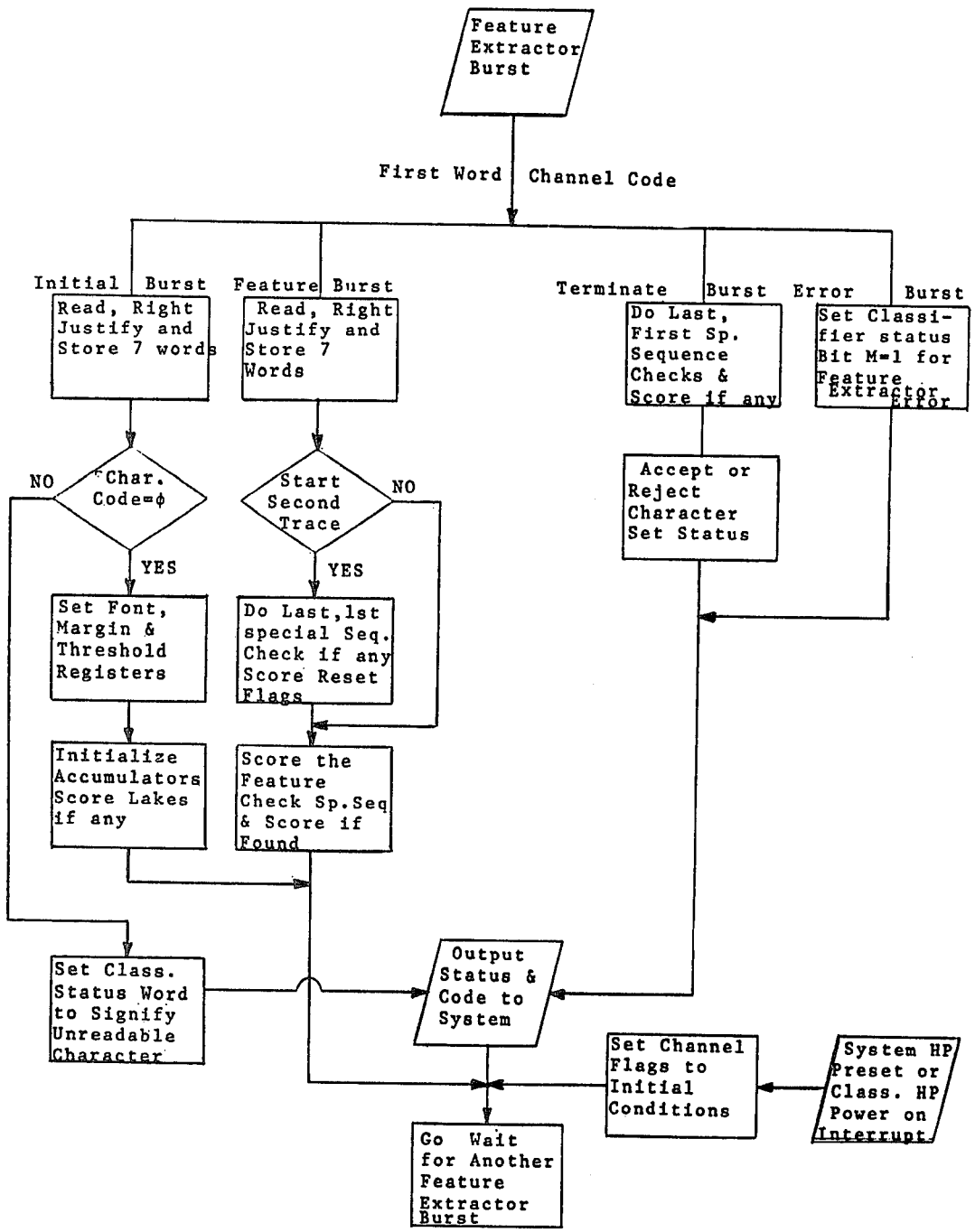
FIGS. 16–19 illustrate flow charts useful in the explanation of the classifier logic network included within the system of FIG. 1.

The basic flowchart for the classifier operation appears in FIG. 16 and may be used to program a general purpose computer to perform the classifier function. As may be seen, the first operation determines the data burst type transmitted by the feature extractor. The data burst may be either an initial burst, feature burst, terminate burst or an error burst.

Figure 17:
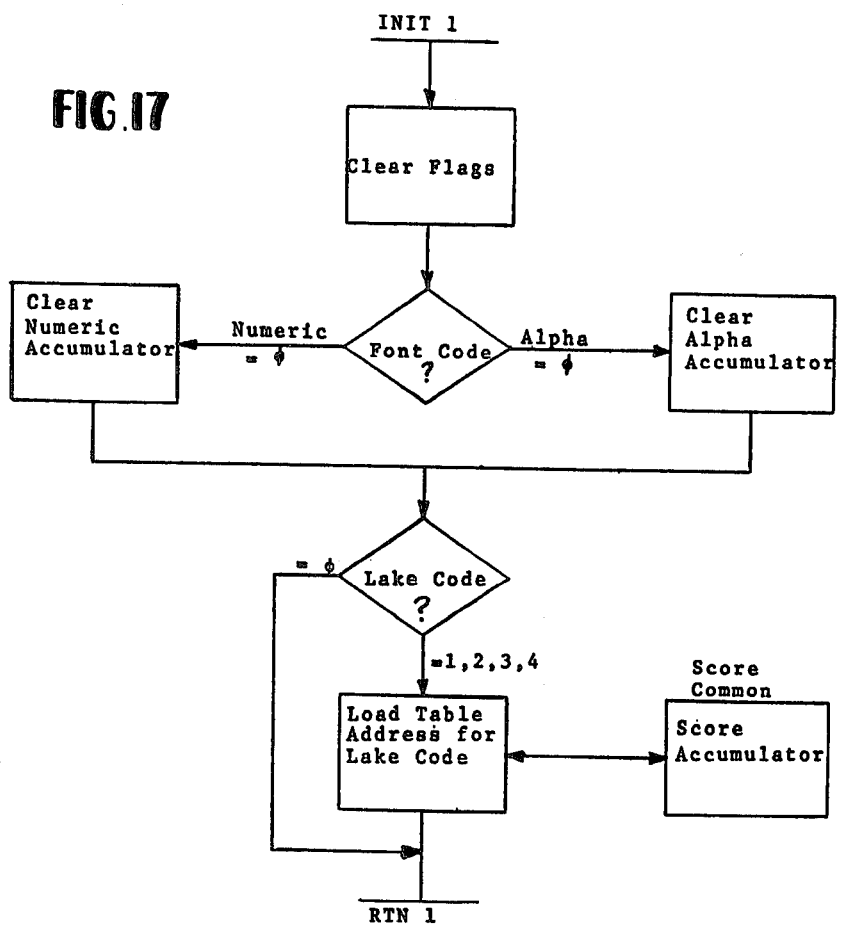
Figure 18:
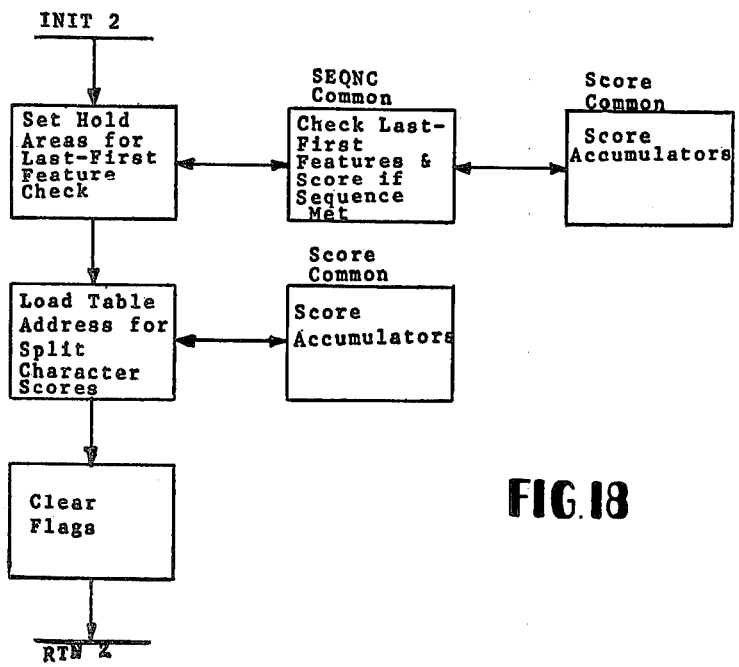
Figure 19:
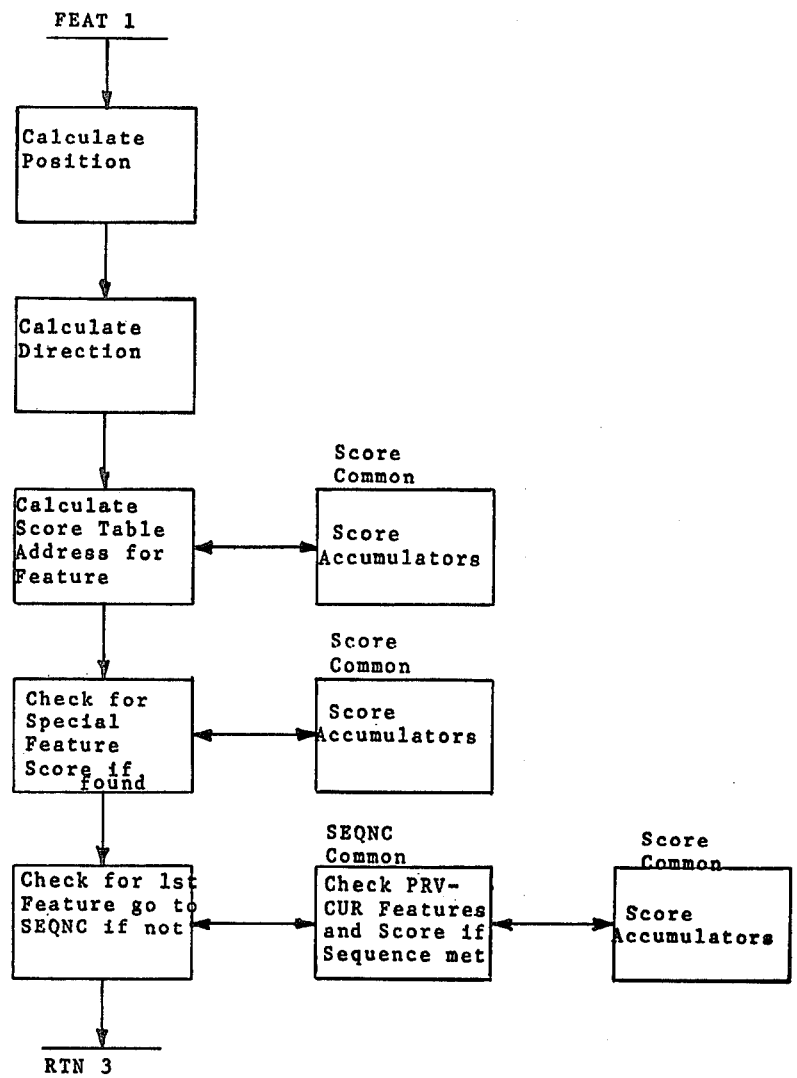

If the character code is $\phi$ signifying a readable character, the classifier is initialized according to a subroutine shown in FIG. 17. Otherwise, a classifier status word is set to signify an unreadable character, and the classifier waits for information about the next character.

As shown in FIG. 16, a terminate burst initiates the search for the accumulators 200 having the highest and next highest scores. A font segment select code generated by the computer determines which of the possible 28 accumulators within the accumulator logic are selected (FIG. 1). When recognizing numerals, the accumulators for the alphabetic characters will not be queried. Typical character styles processed by the instant invention are shown in FIG. 20. The highest score is compared against a threshold value preset by the control computer and against the second highest score. If the highest score is less than the preset recognition threshold value or the difference between the highest score and the next highest score is less than the margin threshold, a reject code is made available. The character code is transferred to a character code register 204 and character status information is transferred to a classifier status memory 206 (FIG. 1). The classifier then awaits information about the next character following transfer of information from the register 204 and the status memory 206 to the computer via a pair of multiplexers 208 and 210 and via a buffered data register 212 and the multiplexer 210, respectively (FIG. 1).

If an error burst occurs, the classifier status word is set to indicate that an error condition occurred during the future extraction process and this information is transmitted to the classifier status memory. The contents of the classifier status memory are then transferred to the computer.

As shown in FIG. 16, if a feature burst occurs, a check for first or second trace is made. If the features are on a second trace, the initialization subroutine constitutes the main activity of the classifier program.

SEQUENCE OF OPERATIONS OF FEAT 1

A. POSITION SELECTION

Each character is divided into three parts: top, middle, and bottom. The first operation which the classifier performs is to calculate the position of the feature relative to the $\frac{2}{8}$ and $\frac{5}{8}$ divisions of the character. This is done by comparing an accumulation of the Y coordinates of each index point B2 on the perimeter associated with the feature against an equal number of accumulations of the $\frac{2}{8}$ and $\frac{5}{8}$ line Y coordinates of the character. Cases in which the results are border line are given to the middle. A feature can either be in the top, middle or bottom. The tests are as follows:

| | |
|---|---|
| $Y < \frac{2}{8}$ | Top |
| $\frac{2}{8} < Y < \frac{5}{8}$ | Middle |
| $Y > \frac{5}{8}$ | Bottom |

B. DIRECTION CALCULATION

The direction calculation is done by the use of signed vectors. The pointer end of the vector is the X, Y accumulations of index points B2 and the base end of the vector is the X, Y accumulations described above. Additionally, the vector is inverted for concave features, causing the direction to point away from the concavity.

C. SCORING

At this time the feature type position, and direction are combined to establish an address for a partial score in memory. The contents of the score memory at the computed locations are added to those accumulators selected by the font segment select code to implement the linear discriminant function.

D. SPECIAL FEATURE

After the scoring operation has been performed, the classifier checks for special features. These are combinations of regular features which are intended to represent conditions unique to one or more characters.

1. DOUBLE-SPUR-TOP

This is a combination of two spurs (or short spurs) in the top or middle of the character pointing in a northerly direction. The allowable features which may comprise this combination are as follows:

| | | |
|---|---|---|
| Spur | Top | NW, N, NE |
| Spur | Middle | N, NE |

-continued

| | | |
|---|---|---|
| Short Spur | Top or Middle | N, NE |

As an additional restriction the two features must be parallel within one unit of direction.

2. DOUBLE-BAY-WEST

This is a combination of two bays of cusps pointing in a westerly direction. The allowable features are:

| | | |
|---|---|---|
| Bay | Top | SW, W |
| Cusp | Top | SW, W |
| Bay | Middle or Bottom | SW, W, NW |
| Cusp | Middle or Bottom | SW, W, NW |

3. DOUBLE-SPUR-BOTTOM

This is a combination of two spurs in the bottom of the character pointing in a southerly direction. The allowable features are as follows:

| | | |
|---|---|---|
| Spur | Bottom | SE, S, SW |

4. SPECIAL SEQUENCES

There are also 4 possible feature sequences which the classifier detects. Detection of these sequences involves looking at the features in pairs, first-second, second-third, etc. The first feature must be paired with the last feature before checking can be terminated.

These four features are spur-bay top, bay-spur top, spur-bay bottom and bay-spur bottom. The allowable combinations are as follows: spur-bay top where a spur appears at the top followed by a bay appearing at the top or middle, bay-spur top where a bay appears at the top or middle followed by a spur appearing at the top, spur-bay bottom where a spur appears at the bottom followed by a bay appearing at the bottom or middle, bay-spur bottom where a bay appears at the bottom or middle followed by a spur appearing at the bottom. Additionally, the two features in the sequence must be parallel within one unit of direction. These special features, if detected, are scored in the regular manner.

5. SPLIT CHARACTER

The final special feature is a split character feature. This is necessitated because certain prototypes are actually split. This feature is determined by the existence of a second legitimate trace.

Although the invention has been described herein with reference to specific embodiments, many modifications and variations therein will readily occur to those skilled in the art. Accordingly, all such variations and modifications are included within the intended scope of the invention as defined by the following claims.

We claim:

1. Multi-font optical character recognition apparatus for converting character representative symbols located on a storage medium in the form of a two-dimensional field of brightness values into a digital code representative of said symbol, said apparatus including scanning means for optically scanning the storage medium to generate analog signals representative of the brightness values, contrast means for measuring the difference between the analog signals produced by the various brightness values, means for converting the analog signals into one bit digital data signals denoting either blackness for the symbol or whiteness for the background in dependence on the measurement of the contrast means, perimeter trace means for developing contour digital data representative of incremental movements between data points about the perimeter of the symbol, and recognition means for converting the contour data into a digital code representing the scanned symbol, wherein the improvement comprises a perimeter tracing means including:

a character memory for storing the one bit digital data signals in predetermined arrays representing corresponding segmental areas of the scanned symbol, address means for addressing particular data bits in the character memory, a perimeter trace table memory for storing a search sequence for finding the perimeter of the character, and control means for causing the address means to follow the search sequence stored in the perimeter trace table so that the perimeter of the symbol stored in the character memory is searched for in a 5 × 5 array of a portion of the character memory according to the following sequence: row 2, col. 1; row 2, col. 2; row 2, col. 3; row 1, col. 2; row 1, col. 3; row 1, col. 4; row 2, col. 4; row 3, col. 4; row 2, col. 5; row 3, col. 5; row 4, col. 5; row 4, col. 4; row 4, col. 3; row 5, col. 4; row 5, col. 3; row 5, col. 2; row 4, col. 2; row 3, col. 2; row 4, col. 1; row 3, col. 1; row 2, col. 1; stopping in the search whenever a part of the perimeter is found, and beginning a new search with a shifted 5 × 5 array.

2. Multi-font optical character recognition apparatus according to claim 1 wherein the means for converting the analog signals includes means for digitizing the analog signals into multi-bit digital data signals representative of the amplitude of the analog signals and a preprocessing means for conditioning the multi-bit digital data signals, including means for accumulating the digital information into predetermined arrays and means for changing the information into the one bit digital data denoting either blackness or whiteness.

3. A multi-font optical character recognition apparatus according to claim 2 further including a scaling means in the preprocessing means for scaling the multi-bit digital data signals to a predetermined number of new digital data signals representative of the brightness in selected segments of the scanned storage medium comprising register means for storing the digital data signals developed from a first complete line in the scan of the entire storage medium and means for comparing the stored digital data signals with the digital data signals developed from a second complete line in the raster scan of the entire storage medium for blackness values and transmitting the multi-bit digital data having the greatest blackness values to the accumulating means of said preprocessing means.

4. A multi-font optical character recognition apparatus according to claim 1 wherein said contrast measurement means includes a control means for said image scanning means, said control means supplying first vertical and horizontal scanning signals to the image scanning means to generate a preliminary raster scan of selected portions of said storage medium and develop information representative of the legibility of the character representative symbols based on the difference in the analog signals produced from the symbol and its background, and second vertical and horizontal scanning signals to the image scanning means to generate a raster scan of the entire storage medium to develop information representative of the recorded character representative symbols.

5. A multi-font optical character recognition apparatus according to claim 3 wherein the accumulating means of the preprocessing means comprises register means for sequentially accumulating the scaled digital data signals into sequential arrays corresponding to the scanning of a selected area on the storage medium by the scanning means and wherein the means for changing comprises means for sampling the arrays in, through and about the centers of the arrays and comparing the center bit values with the values of the bits surrounding the center bit in said arrays for blackness to classify the center bit values as either black or white.

6. Contrast means for developing information representative of the legibility of symbols in a multi-font optical character recognition system, in which character symbols in the form of fields of brightness values recorded on a storage medium are scanned to develop analog information signals representative of the symbols, comprising:

means for vertical and horizontal pre-scanning of the symbols in selected areas according to a predetermined pattern prior to scanning to develop the analog information signals representative of the symbols;

means for measuring the differences between analog signals generated during the pre-scanning; and means for determining if the symbols can be read and the best speed at which to scan it on the basis of the differences between analog signals generated during the pre-scanning.

7. Image enhancement means for converting multi-bit digital signals into one-bit representations denoting either blackness or whiteness in a multi-font optical character recognition system in which character symbols in the form of a field of brightness values recorded on a storage medium are converted into a predetermined array of digital signals for each segmental area of the symbol, comprising:

means for storing the digital signals that represent a 3 × 3 array centered about the multi-bit digital signal to be enhanced;

means for generating a first signal if the multi-bit digital signal to be enhanced is less than a first reference level;

means for generating a second signal if the multi-bit digital signal to be enhanced is less than a second reference level;

means for generating eight sum signals equal to the summation of the multi-bit digital values in the horizontal, vertical and diagonal rows of the 3 × 3 array;

means for generating a third signal if one of the four sum signals representative of the sum of the multi-bit digital data in the horizontal, vertical and diagonal lines passing through the 3 × 3 array center, is less than a third reference level; p1 means for generating a fourth signal if any one of the four sum signals representative of the sum of the multi-bit digital data in the horizontal, vertical and diagonal lines passing through the 3 × 3 array center are less positive than any one of the four sum signals representative of the sum of the multi-bit digital data in the horizontal lines about and below the 3

× 3 array center and the vertical lines to the left and right of the 3 × 3 array center; and means for setting the one-bit representation of the center segmental area to be enhanced to a blackness signal whenever the first signal is present or whenever the second, third and fourth signals are present simultaneously.

8. The system of claim 7 further including perimeter trace processing means for developing contour signals from the one-bit representations of the symbol by searching for the perimeter of the symbol in a 5 × 5 matrix of a portion of the array of one-bit representations according to the following digital search sequence: row 2, col. 1; row 2, col. 2; row 2, col. 3; row 1, col. 2; row 1, col. 3; row 1, col. 4; row 2, col. 4; row 3, col. 4; row 2, col. 5; row 3, col. 5; row 4, col. 5; row 4, col. 4; row 4, col. 3; row 5, col. 4; row 5, col. 3; row 5, col. 2; row 4, col. 2; row 3, col. 2; row 4, col. 1; row 3, col. 1; row 2, col. 1; and stopping in the search and returning to row 2, col. 1, whenever a one-bit representation of blackness is found.

* * * * *

UNITED STATES PATENT OFFICE
CERTIFICATE OF CORRECTION

Patent No. 4,097,847          Dated  June 27, 1978

Inventor(s) Forsen et al.

It is certified that error appears in the above-identified patent and that said Letters Patent are hereby corrected as shown below:

Column 4, line 17, "recorder" should read -- recorded --.
Column 5, line 23, "date" should read -- data --.
Column 7, line 3, "FIG. 3" should read -- FIG. 1B --;
       line 4, "the the supplies" should read -- supplies --.
Column 9, line 62, delete "and".
Column 11, line 39, "000-101" should read -- (000-101) --;
       line 50, "perimater" should read -- perimeter --.
Column 12, line 26, "106 (ALU) 106" should read -- (ALU) 106 --.
Column 14, line 22, "ued" should read -- used --;
       line 51, "guard spacing" should read -- guard space --.
Column 16, line 55, "VQL" should read -- YQL --;
       line 57, VCL" should read -- YCL --.
Column 17, line 7, "VQL" should read -- YQL --.
Column 21, lines 43-47 of table, should read as follows:

|    | 3  | 4  | 5  |    |
|----|----|----|----|----|
| 0  | 1  | 2  | 6  | 8  |
| 19 | 17 | B  | 7  | 9  |
| 18 | 16 | 12 | 11 | 10 |
|    | 15 | 14 | 13 |    |

SEARCH PATTERN

UNITED STATES PATENT OFFICE
CERTIFICATE OF CORRECTION

Patent No. 4,097,847    Dated June 27, 1978

Inventor(s) Forsen et al.

It is certified that error appears in the above-identified patent and that said Letters Patent are hereby corrected as shown below:

Column 23, line 25, "welldefined" should read -- well-defined --.
Column 25, following the headings in TABLE II, between lines 15 and 20, "-(move data)" and "-(move adr)" should be indented a few spaces;
    between lines 20 and 25 "$\Delta x$ (RH)", "$\Delta x$ (LH) and $\Delta y$" should be indented a few spaces;
    line 46, "miroprogram" should read -- microprogram --.
Column 26, line 33, "'spur'" should read -- "spurs" --;
    line 56, "(FEX1, FEX2, FEX4, FEX5)," should read -- ($\overline{FEX1}$, $\overline{FEX2}$, $\overline{FEX4}$, $\overline{FEX5}$), --.
Column 27, line 47, change "37 accumulate" to -- accumulate --;
    line 53, delete """ (first occurrence).
Column 32, line 1, "$W_{in}$ =" should read -- $W_{in}$ + --; and
Column 36, line 61, delete "p1" and bring "means for gen-" out to the left margin.

Signed and Sealed this

Sixteenth Day of January 1979

[SEAL]

Attest:

RUTH C. MASON  
Attesting Officer

DONALD W. BANNER  
Commissioner of Patents and Trademarks